US008267622B1

(12) United States Patent
MacLean-Blevins et al.

(10) Patent No.: US 8,267,622 B1
(45) Date of Patent: Sep. 18, 2012

(54) CARRIER APPARATUS FOR PNEUMATIC TUBE DELIVERY SYSTEM

(75) Inventors: Mark MacLean-Blevins, Westminster, MD (US); Steven Dahl, Baltimore, MD (US); Frederick M. Valerino, Sr., Timonium, MD (US)

(73) Assignee: Pevco Systems International, Inc., Baltimore, MD (US)

( * ) Notice: Subject to any disclaimer, the term of this patent is extended or adjusted under 35 U.S.C. 154(b) by 0 days.

(21) Appl. No.: 13/307,824

(22) Filed: Nov. 30, 2011

(51) Int. Cl.
*B65G 51/06* (2006.01)
(52) U.S. Cl. ........................................ 406/186; 406/190
(58) Field of Classification Search .................. 406/184, 406/185, 186, 187, 188, 189, 190
See application file for complete search history.

(56) References Cited

U.S. PATENT DOCUMENTS

| | | | | |
|---|---|---|---|---|
| 3,266,751 | A | * | 8/1966 | Purdy et al. .................... 406/189 |
| 3,787,007 | A | | 1/1974 | Alexandrov et al. |
| 3,825,210 | A | | 7/1974 | Weaver |
| 4,114,835 | A | | 9/1978 | Alexandrov et al. |
| 4,529,335 | A | | 7/1985 | Hilbert et al. |
| 4,546,874 | A | | 10/1985 | Kirchhan |
| 4,620,577 | A | * | 11/1986 | Nordenswan .................... 141/98 |
| 4,948,303 | A | | 8/1990 | Good |
| 5,636,947 | A | | 6/1997 | Valerino, Sr. et al. |
| 5,655,677 | A | | 8/1997 | Fratello et al. |
| 5,864,485 | A | | 1/1999 | Hawthorne et al. |
| 5,871,308 | A | | 2/1999 | Valerino, Sr. et al. |
| 5,901,966 | A | * | 5/1999 | Valerino et al. ................ 277/548 |
| 5,980,164 | A | | 11/1999 | Fratello |
| 6,234,723 | B1 | | 5/2001 | Thalmayr |
| 6,477,442 | B1 | | 11/2002 | Valerino, Sr. |
| 6,702,150 | B2 | | 3/2004 | Sumetzberger |
| 6,959,229 | B2 | | 10/2005 | Eidemiller |
| D520,136 | S | | 5/2006 | Keller et al. |
| 7,097,391 | B1 | | 8/2006 | Keller et al. |
| 7,241,081 | B1 | * | 7/2007 | Keller et al. ................... 406/186 |
| 7,243,002 | B1 | | 7/2007 | Hoganson et al. |
| 7,363,106 | B1 | | 4/2008 | Hoganson et al. |
| 7,424,340 | B2 | | 9/2008 | Owens |
| 7,455,481 | B1 | * | 11/2008 | Keller et al. ................... 406/188 |
| 7,874,768 | B1 | | 1/2011 | Keller et al. |
| 7,953,515 | B2 | | 5/2011 | Hoganson et al. |
| 2010/0247251 | A1 | | 9/2010 | Cornelius |
| 2011/0186630 | A1 | | 8/2011 | Hoganson et al. |

\* cited by examiner

*Primary Examiner* — Joseph A Dillon, Jr.
(74) *Attorney, Agent, or Firm* — Rosenberg, Klein & Lee

(57) ABSTRACT

A carrier apparatus is provided for transport through a pneumatic tube delivery system. The carrier apparatus comprises a housing contoured with forward and aft portions and an axially extended body portion disposed therebetween. The housing includes at least first and second separable sections enclosing a carrying compartment. At least a pair of retaining assemblies are detachably coupled to the housing, with each retaining assembly encircling the housing's body portion to couple the first and second housing sections for angular displacement one relative to the other between open and closed configurations. Each of the retaining assemblies includes a glide band portion disposed to protrude radially from the housing in the closed configuration for slidably engaging an inner wall surface of a pneumatic delivery tube. At least one latch assembly is coupled to releasably lock the housing sections in the closed configuration.

25 Claims, 18 Drawing Sheets

CARRIER APPARATUS FOR PNEUMATIC TUBE DELIVERY SYSTEM

BACKGROUND OF THE INVENTION

The present invention is generally directed to a carrier apparatus for a pneumatic tube delivery system. More specifically, the subject carrier apparatus is one which safely and securely transports various items through the tubular conduits of a given pneumatic tube delivery system. The subject carrier apparatus provides simple yet durable structure that facilitates safe, convenient handling and use.

Pneumatic tube delivery systems are widely used in various institutions. The system is implemented in different forms depending on the nature of the operations and transactions carried out at a particular facility. Nonetheless, the systems invariably share certain basic components. First, a network of tubular conduits is established throughout the facility, branching out to various user outlets connected to respective send/receive workstations, or portals. Items of interest are then transported between user outlets via the network of delivery tubes by a capsule-like carrier, the contents of which are filled by a user at an originating outlet and emptied by a user at a receiving outlet. The carrier's travel through the network of tubular conduits is driven by one or more blower units which generate sufficient pneumatic flow (such as by vacuum pressure) to propel various capsules through different portions of the network. Typically, a computer-based controller unit(s) operates to regulate carrier traffic and maintain overall system operation.

The network of tubular conduits can become quite complex even in modest sized facilities, since delivery access between all combinations of user outlets is often required. The network generally incorporates multi-port diverters, or transfer units, at certain intermediate points in the network. These units operate to physically transfer a carrier from one branch (or section) of the tubular conduit network to another for delivery to the proper destination outlet. While such diverter/transfer units markedly reduce redundancy in conduit segments, the network remains quite elaborate in systems serving numerous outlets, with individual conduit segments making numerous turns and bends to serve the many user outlets.

Among the institutions that employ pneumatic tube delivery systems are financial institutions such as banks which use the systems to remotely conduct customer transactions in real time. Others include industrial and retail facilities where payload items like documents, currency, parts, or merchandise are transported from one location to another. Perhaps the most prevalent and demanding uses may be in healthcare institutions like hospitals, where the need for quick and efficient physical transport of items between remote locations within the facility tend to be the rule, not the exception. Items such as pharmaceuticals, lab specimens, blood products, and the like must be passed between different staff members quickly and reliably. It is not uncommon for hospitals to carry out several thousands of transports for delicate payloads like this on a daily basis.

There are numerous challenges to maintaining efficient operation of pneumatic tube delivery systems, especially those deployed in such heavy-use, critical settings. A number of notable challenges pertain to the structure and form of the carrier employed in the system. Since each and every transport necessarily involves a carrier, it is imperative that the carrier be viable in structure. At a minimum, it must be wide enough to substantially 'plug' the tubular delivery conduit segments for pneumatic propulsion therethrough, yet streamlined enough to negotiate all the turns, bends, and other transition points in the tubular conduit network smoothly, and without getting 'stuck' inside. Were a carrier to become stuck somewhere in the network, the great labyrinth of tubular conduits and transitional hardware deployed in many facilities make it a major effort to precisely locate and free the carrier. While a stuck carrier is sometimes extracted by manually operating a blower to either push or pull the carrier free, it can mean at least a partial shutdown of the system for an extended period. In that event, technicians would need ample time to carry out the tedious task of first locating the stuck carrier, then accessing the carrier by disassembling or even cutting the conduit segment in question, before restoring the conduit segment for use upon extrication of the carrier.

Reliably ensuring that the carriers are properly closed for transport is another constant challenge. Because the carrier travels through confined spaces at high speeds, being all the while subject to forceful impact and abrupt changes of direction, there is much to potentially disturb and jar a carrier's closure mechanism loose. For example, the snap-buckle type latching mechanisms used in many carriers heretofore known are prone to spring free when acute incidental contact or a sudden shift in direction disrupt and overcome the mechanism's closure bias. Intervening hardware like transitional/diverter units also present potential snag hazards for such latching mechanisms.

Just as important as keeping a carrier's closure mechanism secure during transport is ensuring that the carrier is properly closed and latched in the first place. Numerous latch mechanisms known in the art may have a closure mechanism that has failed to actually latch the carrier shut, yet appear properly latched to a busy user upon quick (or distracted) glance. The need for a mechanism which effectively guards against such false closure, or which at least makes a false closure conspicuously evident, cannot be understated.

Other challenges derive from the fact that the oft-used carrier must be versatile enough to carry a wide range of payloads. Since their maximum transverse (diametric) dimension is limited by the conduit size employed in the given system, carriers in most systems are necessarily elongated and bulky in form. Yet, their high speed travel through confining tubular conduits precludes the use of external handle attachments to facilitate handling. Consequently, carriers heretofore known in the art tend to be difficult to firmly grasp and safely manipulate with one hand. This is not a trivial hindrance, particularly in critical settings such as hospitals, where carriers are very often loaded with sensitive, delicate payloads like lab specimens and pharmaceuticals, and where use is frequently made amidst pressures to meet patient care needs.

Users in these settings can ill afford to mishandle carriers. Nor can they afford the risks of the carriers tipping or rolling away (and perhaps off a table surface) when they are momentarily set aside during user handling. Yet no adequate safeguard measures are provided by carriers heretofore known in the art.

Still another challenge to efficient, reliable system operation is the carriers' general durability in the face of daily repetitive use. In addition to the normal incidental contact encountered during travel through the conduit network and mechanical handling such as at intervening transfer points, carriers typically encounter sharp impact each time they arrive at their destinations. On arrival, the pneumatic flow pressure is cut off and the carrier deposits onto the destination outlet's receiving plate, where it is released and abruptly dropped onto a receiving pad surface. The shock of this impact, especially when repeated over and again with regular use, wears on the carrier and potentially leads to premature stress failure over time at its axial ends and elsewhere.

To enable sufficient air-seal, reduce friction, and provide cushioning as they move through the tubular conduit, carriers typically employ a fabric or brush band typically referred to as a glide-band or wear-band around its circumference. Over time and with repeated use, glide bands become worn down causing their friction reducing and cushioning properties to diminish. At such time, the bands must be replaced. Many carriers known in the art have the band directly attached to the carrier body with adhesive, with some also using a mechanical fastener in addition to an adhesive. This approach makes later removal of the bands for replacement difficult since the adhesive, in order to maintain attachment to the carrier during transport, must be very strong.

These and other challenges are not adequately met by carriers heretofore known in the art. Hence, there is a need for a secure and durable carrier apparatus capable of unencumbered transport through a pneumatic tube delivery system. There remains also a need for a carrier apparatus whose structure preserves reliable payload containment and affords sure, convenient handling by users.

SUMMARY OF THE INVENTION

It is an object of the present invention to provide a carrier apparatus that enables safe and reliable use in a pneumatic tube delivery system.

It is another object of the present invention to provide a carrier apparatus whose structure preserves reliable payload containment and accommodates sure, convenient handling by a user.

These and other objects are attained in a carrier apparatus formed in accordance with the present invention for transport through a pneumatic tube delivery system. The carrier apparatus comprises a housing contoured with forward and aft portions and an axially extended body portion disposed therebetween. The housing includes at least first and second separable sections enclosing a carrying compartment. At least a pair of retaining assemblies are detachably coupled to the housing, with each retaining assembly encircling the housing's body portion to couple the first and second housing sections for angular displacement one relative to the other between open and closed configurations. Each of the retaining assemblies includes a glide band portion disposed to protrude radially from the housing in the closed configuration for slidably engaging an inner wall surface of a pneumatic delivery tube. At least one latch assembly is coupled to releasably lock the housing sections in the closed configuration.

In certain embodiments of the present invention, a carrier apparatus is formed for bidirectional transport through a pneumatic tube delivery system. The apparatus comprises a housing contoured with a pair of opposing end portions and an axially extended body portion disposed therebetween. The housing includes at least first and second separable housing sections enclosing a carrying compartment, with at least a pair of collar assemblies detachably coupled to the housing. The collar assemblies each encircle the body portion of the housing to couple the first and second housing sections for pivotal displacement one relative to the other between open and closed configurations. Each collar assembly includes at least first and second collar segments connected by a hinged joint, which are respectively coupled to the first and second housing sections. A plurality of glide bands are provided, each fastened to one collar assembly to protrude radially from the housing for slidably engaging an inner wall surface of a pneumatic delivery tube. At least one rotary latch member is pivotally coupled to one of the housing sections to releasably lock the other of the housing sections thereto in the closed configuration.

In certain other embodiments of the present invention, a carrier apparatus formed for bidirectional transport through a pneumatic tube delivery system comprises a housing contoured with a pair of opposing end portions and an axially extended body portion disposed therebetween. Each of the end portions is connected to the body portion by a radially constricted neck portion for defining a grasping handle, and is contoured to form a freestanding base for the apparatus. The housing includes first and second axially separable sections enclosing a carrying compartment. At least a pair of collar assemblies are detachably coupled to the housing, with each collar assembly encircling the body portion of the housing to couple the first and second housing sections for pivotal displacement one relative to the other between open and closed configurations. The collar assemblies each include at least first and second collar segments connected by a hinged joint which respectively couple to the first and second housing sections. A plurality of glide bands are each fastened to one collar assembly to protrude radially from the housing for slidably engaging an inner wall surface of a pneumatic delivery tube. At least one rotary latch member is pivotally coupled to one of the housing sections for releasably sealing the other of the housing sections thereto in the closed configuration. A plurality of protective end caps are provided to detachably couple to one of the housing's end portions. The protective end caps are formed of a material greater in resilience than the housing end portions.

DETAILED DESCRIPTION OF THE PREFERRED EMBODIMENTS

Referring now to FIGS. 1-8, there are shown various views of a carrier apparatus 10 formed in accordance with an exemplary embodiment of the present invention. In FIGS. 1-8, carrier apparatus 10 is shown in its closed and fully latched configuration, ready for transport through a pneumatic tube delivery system (not shown).

Carrier apparatus 10 is formed with a housing 100 whose capsule-like structure encloses an internal carrying compartment for various payloads. Housing 100 may be formed of any suitable material known in the art. Because carrier apparatus 10 serves as a transport capsule propelled at high speeds through an extensive network of chutes/tubular conduits, however, housing 100 is formed of a material having the strength, rigidity, density, hardness, and other such material properties sufficient to withstand the structural/inertial punishment encountered during use and protect the payload against the same. In the illustrated embodiment, for example, housing 100 is preferably formed of a dense plastic or polycarbonate material highly resistant to the type of impact and abrasion damage that it might otherwise suffer from continual abrasive, colliding contact with surrounding surfaces and system hardware. This type of material not only resists wear, it also resists the clinging of dirt and other debris that lesser materials are prone to picking up during use.

The overall size of carrier apparatus 10 and its relative dimensions will depend on the particular features of the pneumatic tube delivery system it is to serve. A limiting factor is the diameter of the tube conduits that the carrier apparatus travels through. In hospital facilities, for example, steel piping of four inch, six inch, or other predetermined standard diameter is used for the tube conduits. Carrier apparatus 10 is sized and dimensioned to 'fit' accordingly.

Figure 1:
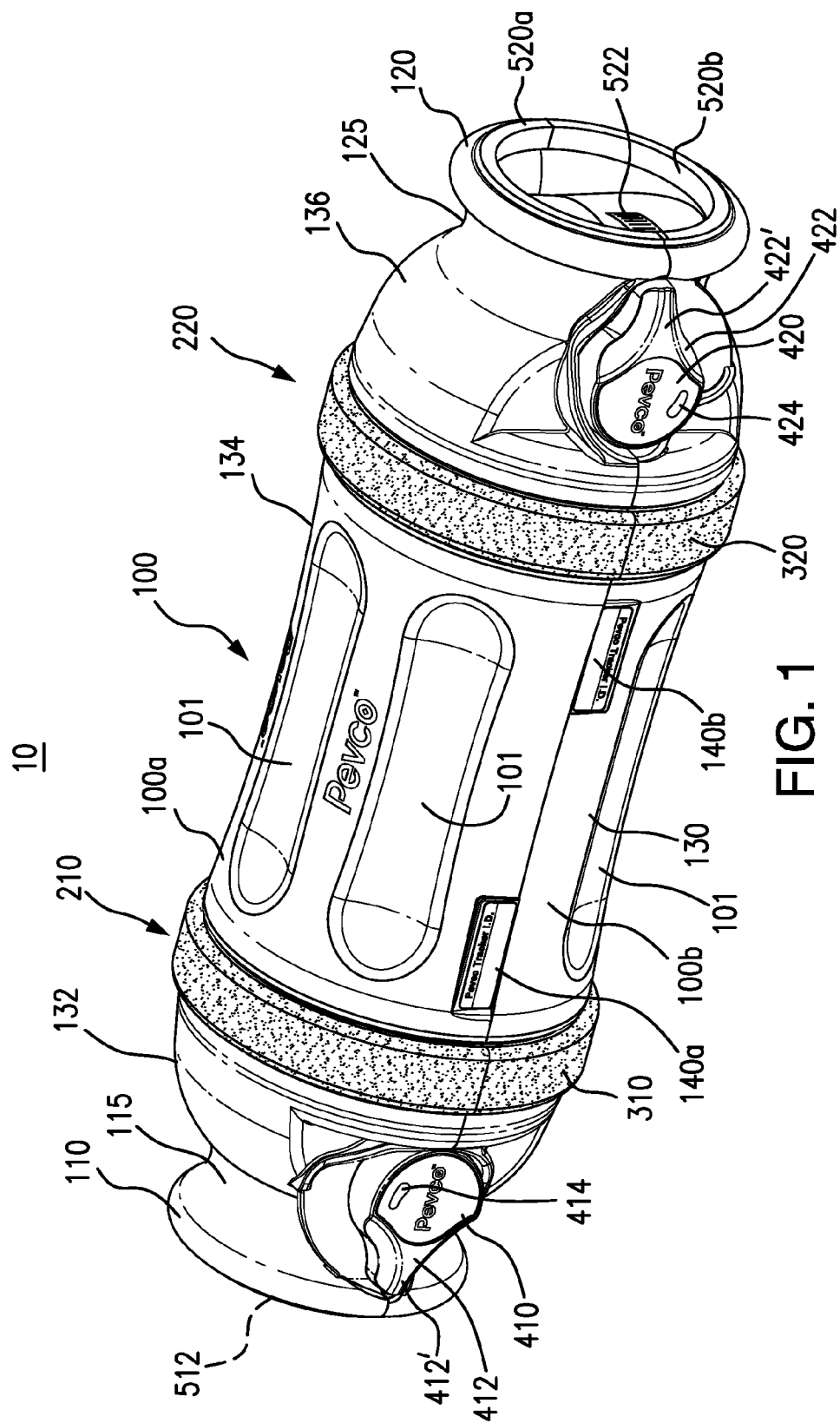
FIG. 1 is a perspective view of a carrier apparatus formed in accordance with an exemplary embodiment of the present invention, illustrated in a closed and fully latched configuration.
Figure 2:
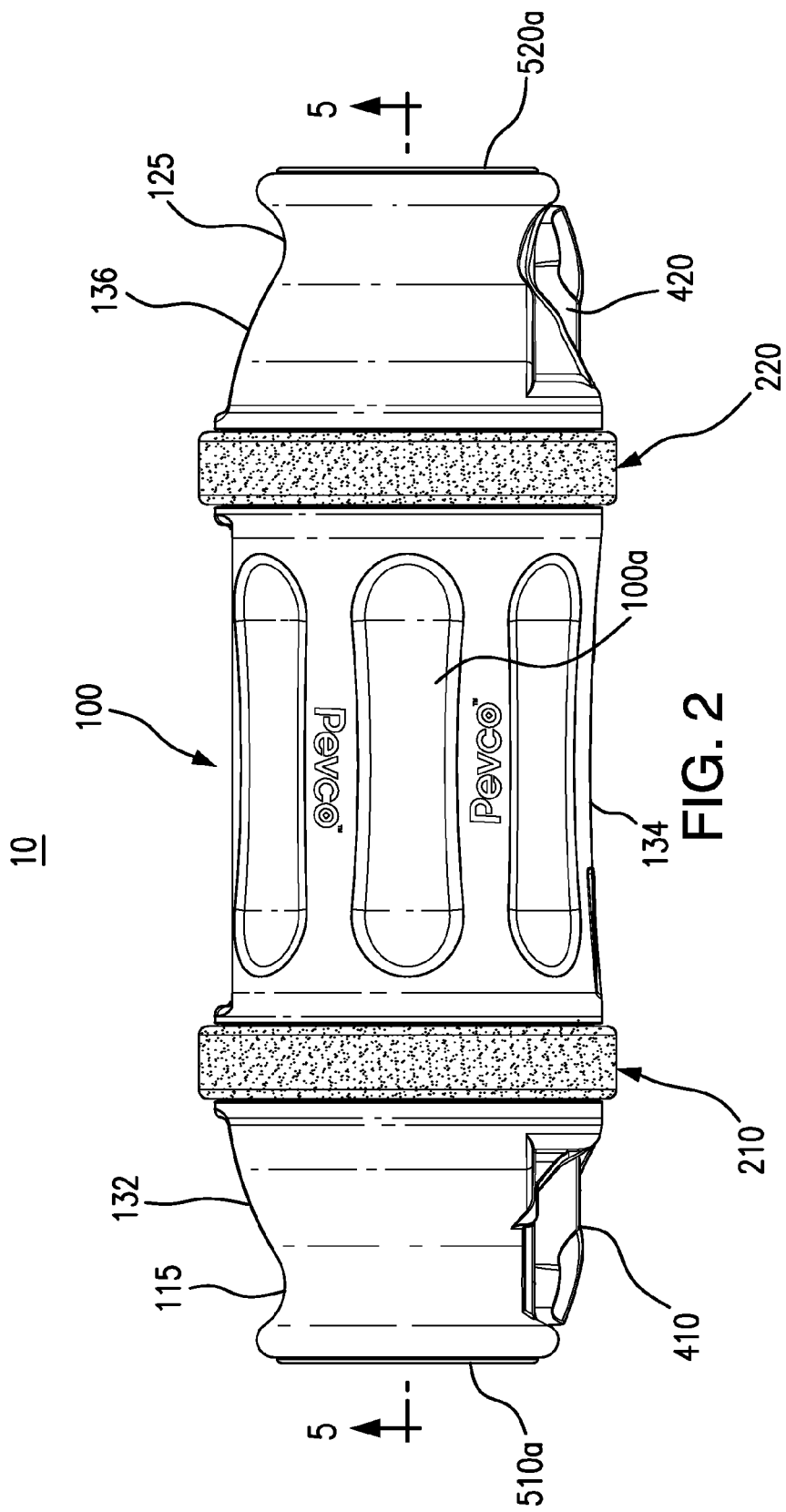
FIG. 2 is a plan view of the carrier apparatus shown in FIG. 1.
Figure 3:
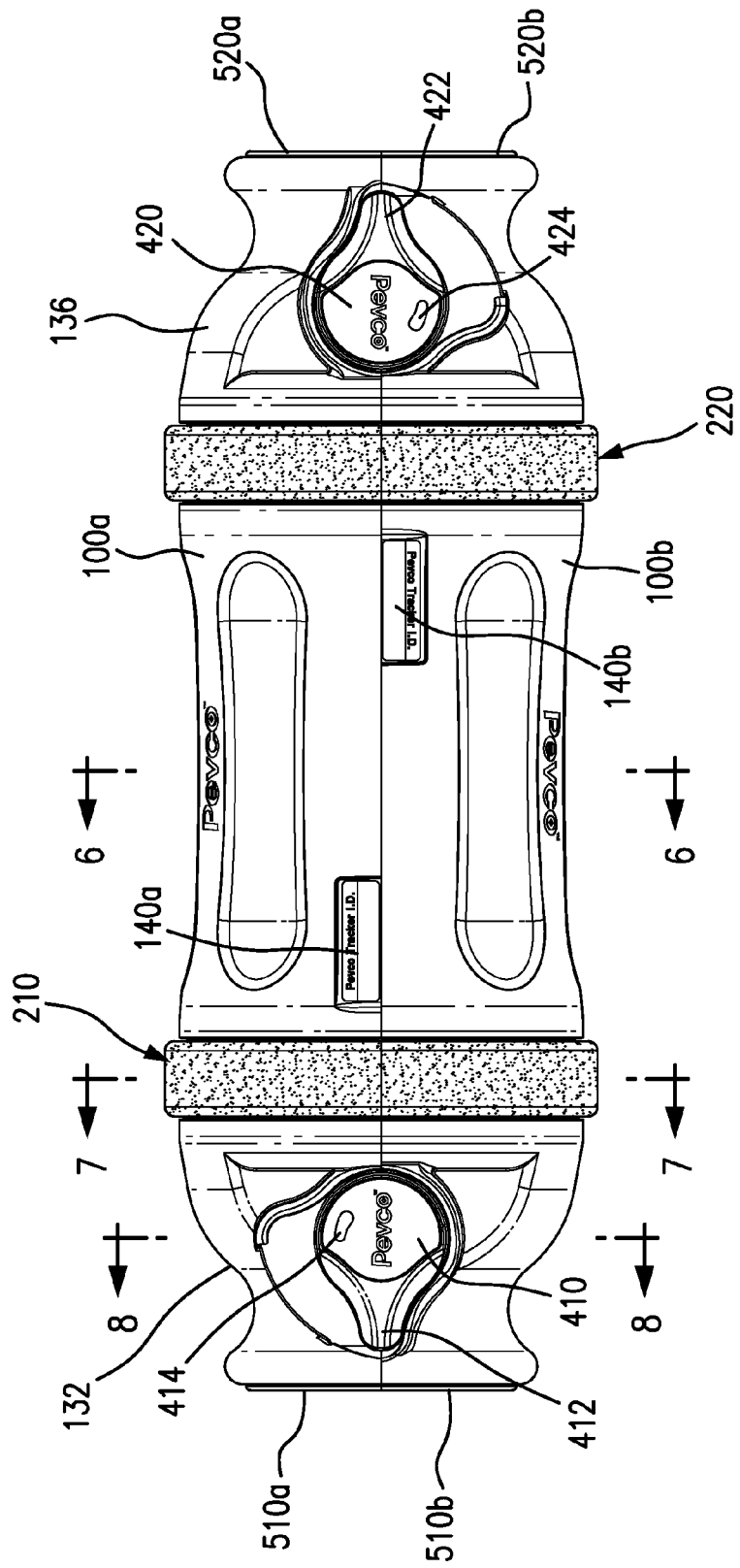
FIG. 3 is a front elevational view of the carrier apparatus shown in FIG. 1.
Figure 4:
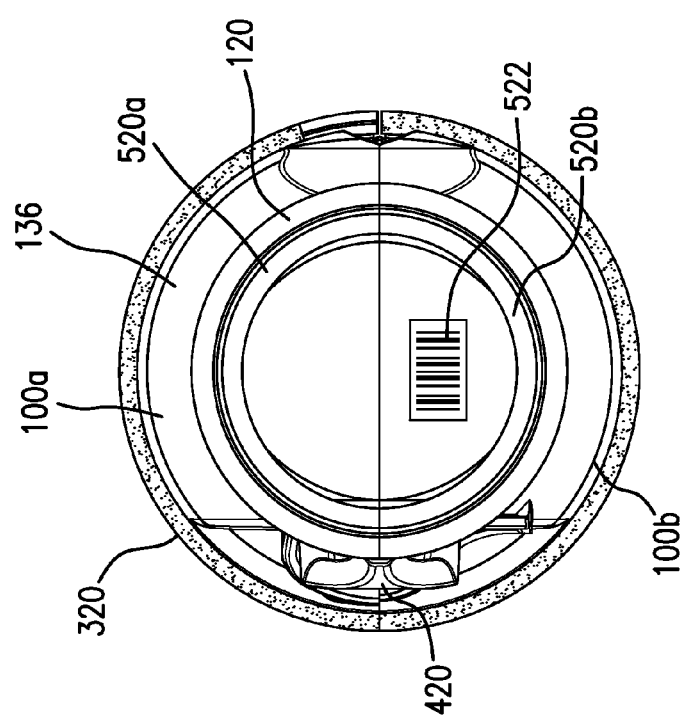
FIG. 4 is a representative side elevational view of the carrier apparatus shown in FIG. 1.
Figure 5:
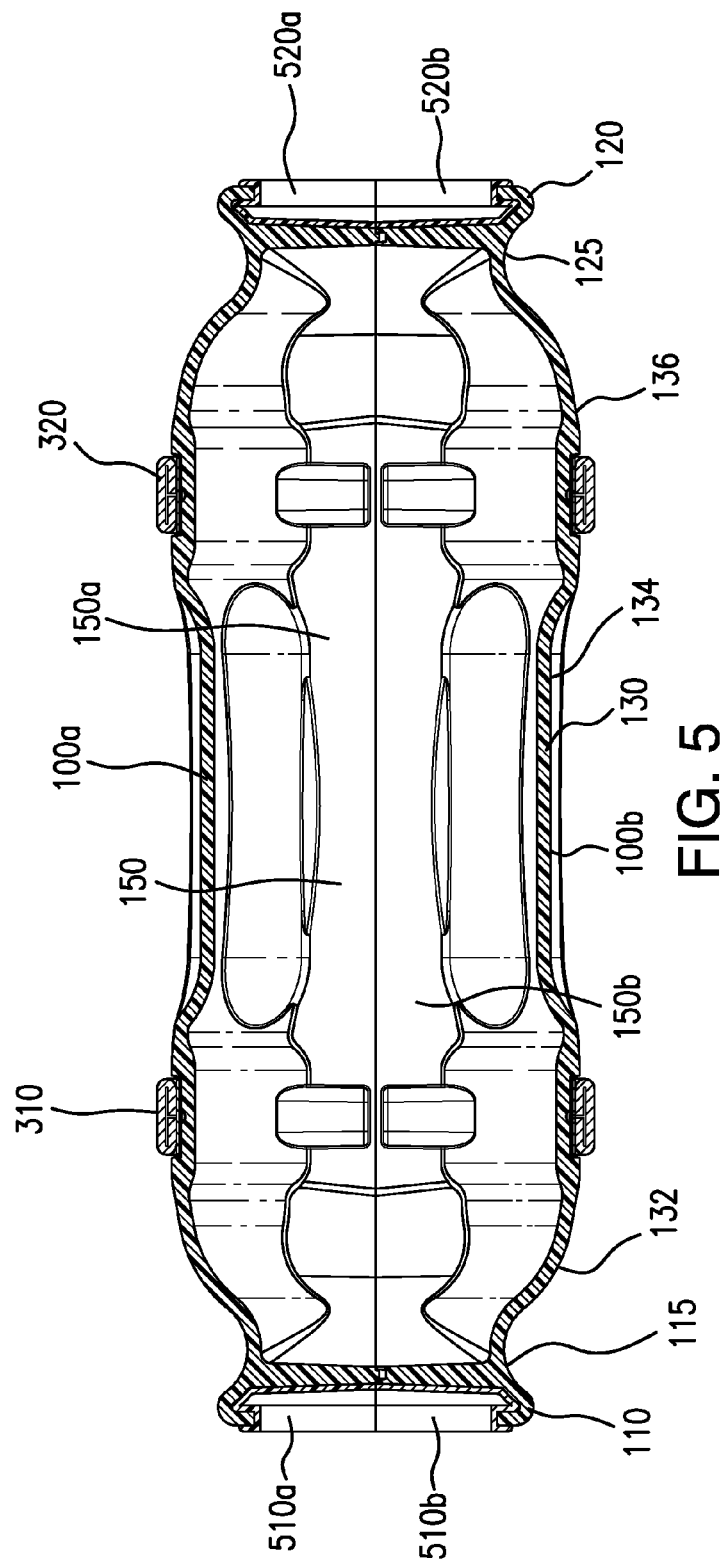
FIG. 5 is a sectional view of the carrier apparatus as shown in FIG. 2, taken along the view lines 5-5.
Figure 6:
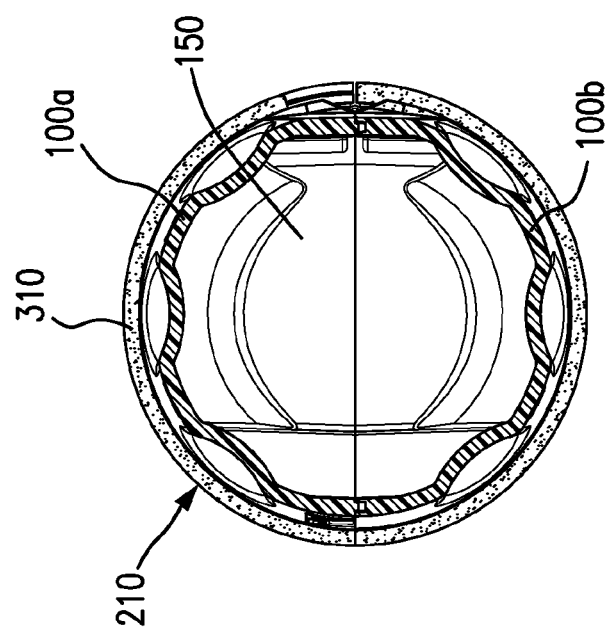
FIG. 6 is a sectional view of the carrier apparatus as shown in FIG. 3, taken along the view lines 6-6.
Figure 8:
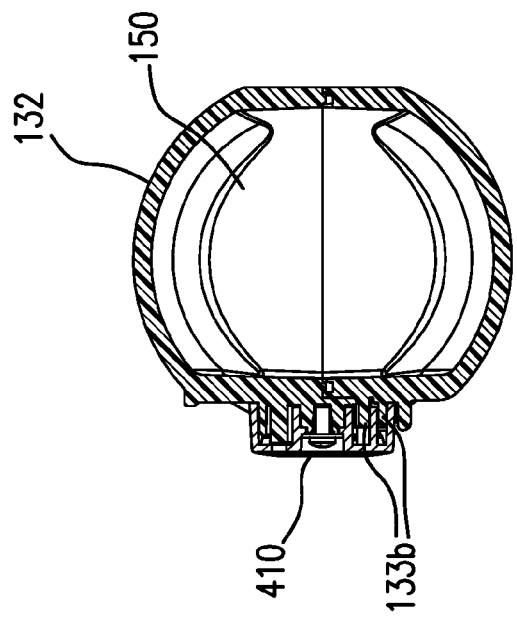
FIG. 8 is a sectional view of the carrier apparatus as shown in FIG. 3, taken along the view lines 8-8.
Figure 7:
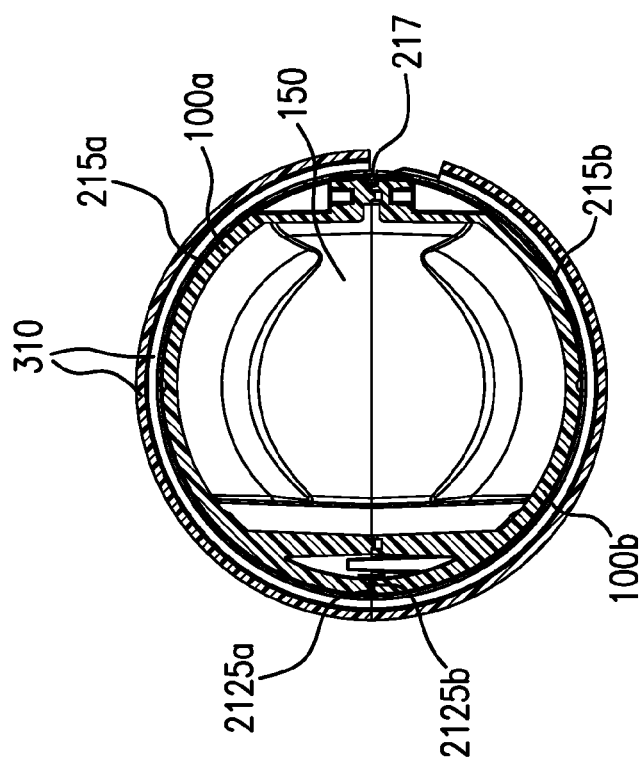
FIG. 7 is a sectional view of the carrier apparatus as shown in FIG. 3, taken along the view lines 7-7.
Figure 9:
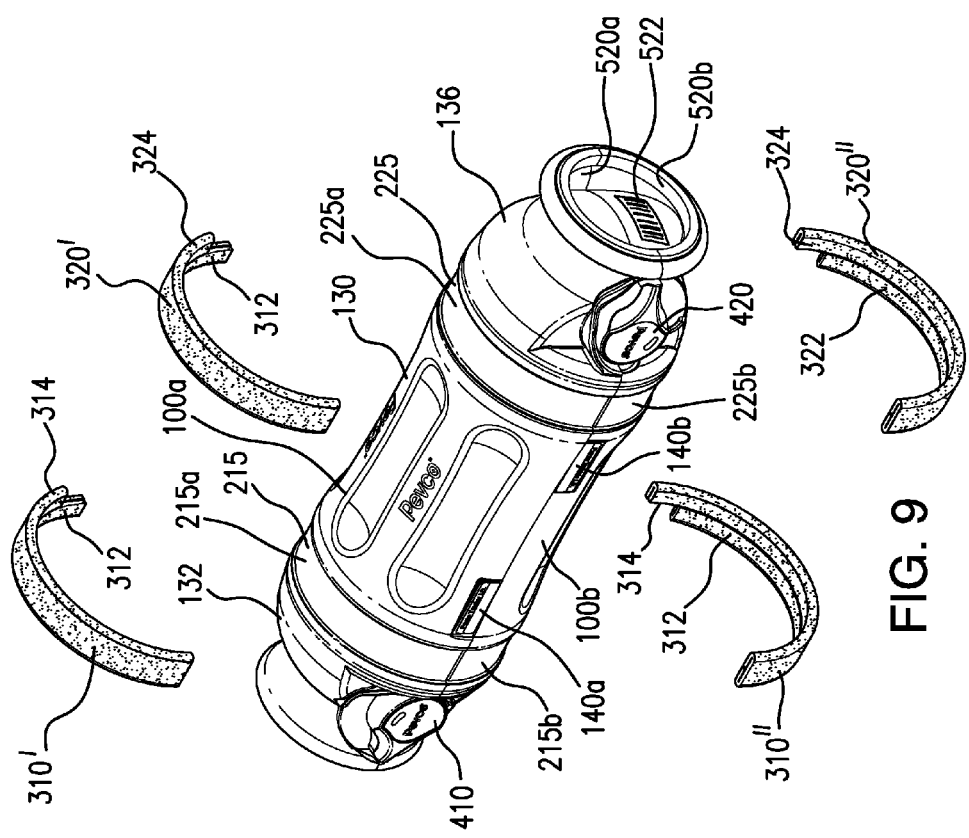
FIG. 9 is a partially exploded perspective view of the carrier apparatus shown in FIG. 1.
Figure 10:
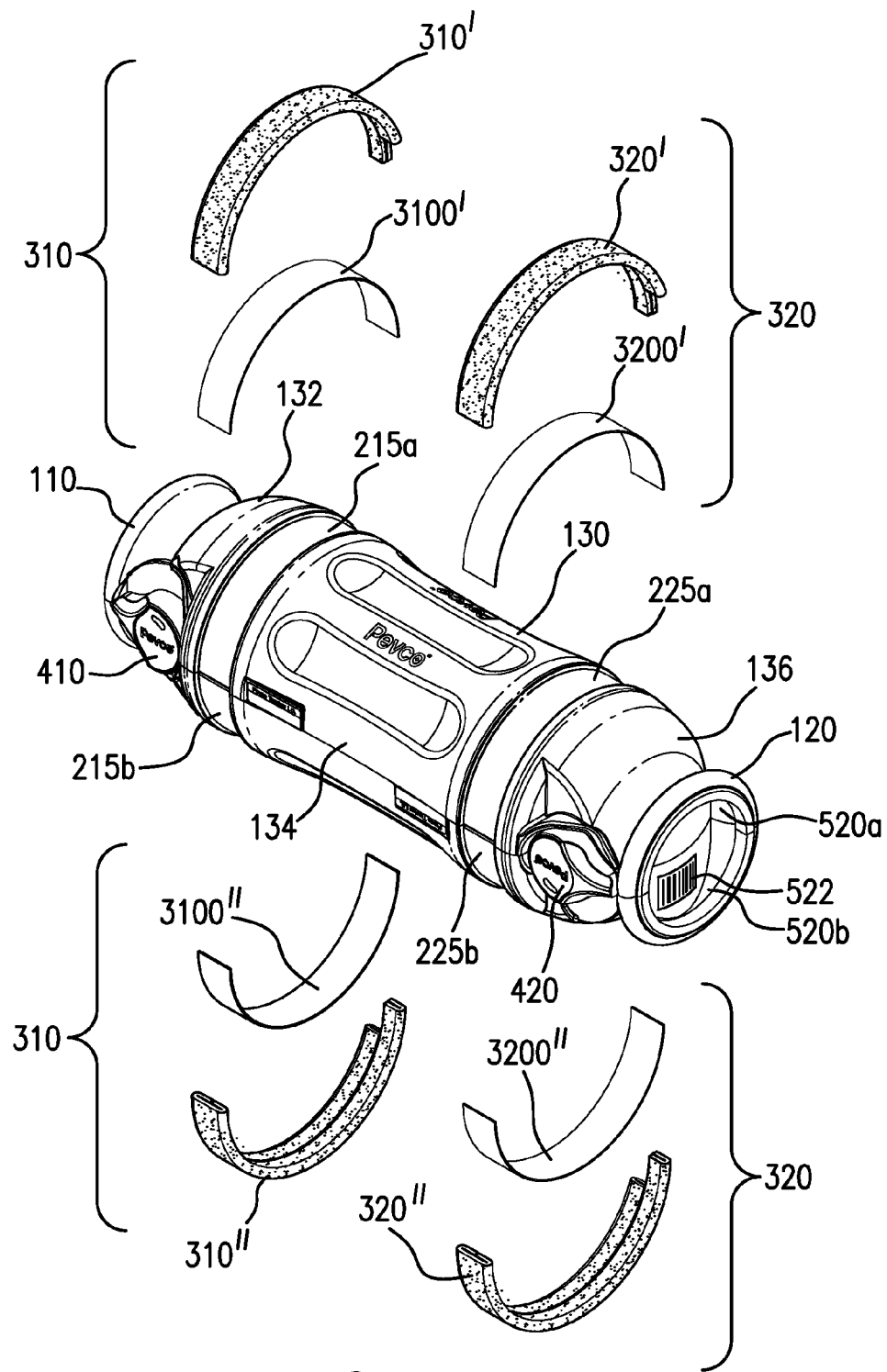
FIG. 10 is another partially exploded perspective view of the carrier apparatus shown in FIG. 1.

The carrier's housing 100 is preferably split in the embodiment shown into two axial half sections 100a, 100b which join together along their peripheral edges to enclose a carrying compartment 150 therebetween. When joined together, these separable sections 100a, 100b collectively define for housing 100 a pair of axial end portions 110, 120 between which an axially extended body portion 130 is disposed. The end portions 110, 120 are preferably, though not necessarily, formed to be substantially symmetric in structure (such that the side elevational view showing end portion 120 illustrated in FIG. 4 is thus representative, much as a substantial mirror reflection, of the opposite side elevational view at end portion 110). Accordingly, the end portions 110, 120 may serve interchangeably as either the forward or aft portions of the carrier apparatus 10, adapting it for bidirectional travel through the pneumatic tube delivery system without regard for any particular forward/aft orientation.

Preferably, one or more informational labels or other suitable indicia 140a, 140b for unique identification are applied at conspicuous portions of the carrier 10. The identifying indicia may include for instance a barcode unique to a particular carrier or a particular user department. In the embodiment shown, identifying indicia 140a, 140b are applied, for example, on respective outer surfaces of the housing sections 100a, 100b making up the carrier's body portion 130. The particularities of the label or other identifying indicia 140a, 140b will be as required for the intended application to enable positive identification of the carrier 10 when leaving and arriving at a workstation, or when otherwise handled at a workstation. In certain embodiments, they are situated and oriented in cooperation with carrier tracking features provided in the given pneumatic tube delivery system for automated or semi-automated reading.

The separable housing sections 100a, 100b are banded together by at least a pair of retaining assemblies 210, 220 detachably coupled to housing 100 to encircle the body portion 130. Retaining assemblies 210, 220 preferably also serve as hinge assemblies for the separable housing sections 100a, 100b by joining those housing sections 100a, 100b together for pivoted angular displacement one relative to the other. The housing sections 100a, 100b may then be opened (see FIG. 14) to reveal the carrying compartment 150 or closed to seal the compartment off. Provided with each retaining assembly is a glide band portion 310, 320 which protrudes radially from the outer surface of housing 100 when it is in the closed configuration. Glide band portions 310, 320 serve much as radial sleds which slidably engage an inner wall surface of the pneumatic delivery tube conduit through which carrier apparatus 10 travels. Each glide band portion 310, 320 radially protrudes to such degree that it maintains sufficient clearance to prevent frictional/abrasive contact between the outer surfaces of housing 100 (and latch assemblies 410, 420 described in following paragraphs) and the conduit's surrounding inner wall surface.

Carrier apparatus 10 further includes at least one latch assembly coupled to releaseably lock the housing sections 100a, 100b together when the housing 100 is in its closed configuration. In the embodiment shown, a pair of latch assemblies 410, 420 are employed to provide the necessary securement. Each latch assembly 410, 420 utilizes a rotary latch member 412, 422 coupled to one of the housing sections 100a, 100b for angular displacement between an unlatched angular position (see FIGS. 13-14) and a range of progressive latching positions ending at the fully latched position shown in FIGS. 1-8. The latch member of each assembly 410, 420 is disposed in an accommodating recess formed into housing 100 so as to avoid excessive, potentially obstructive protrusion from housing 100.

Figure 11:
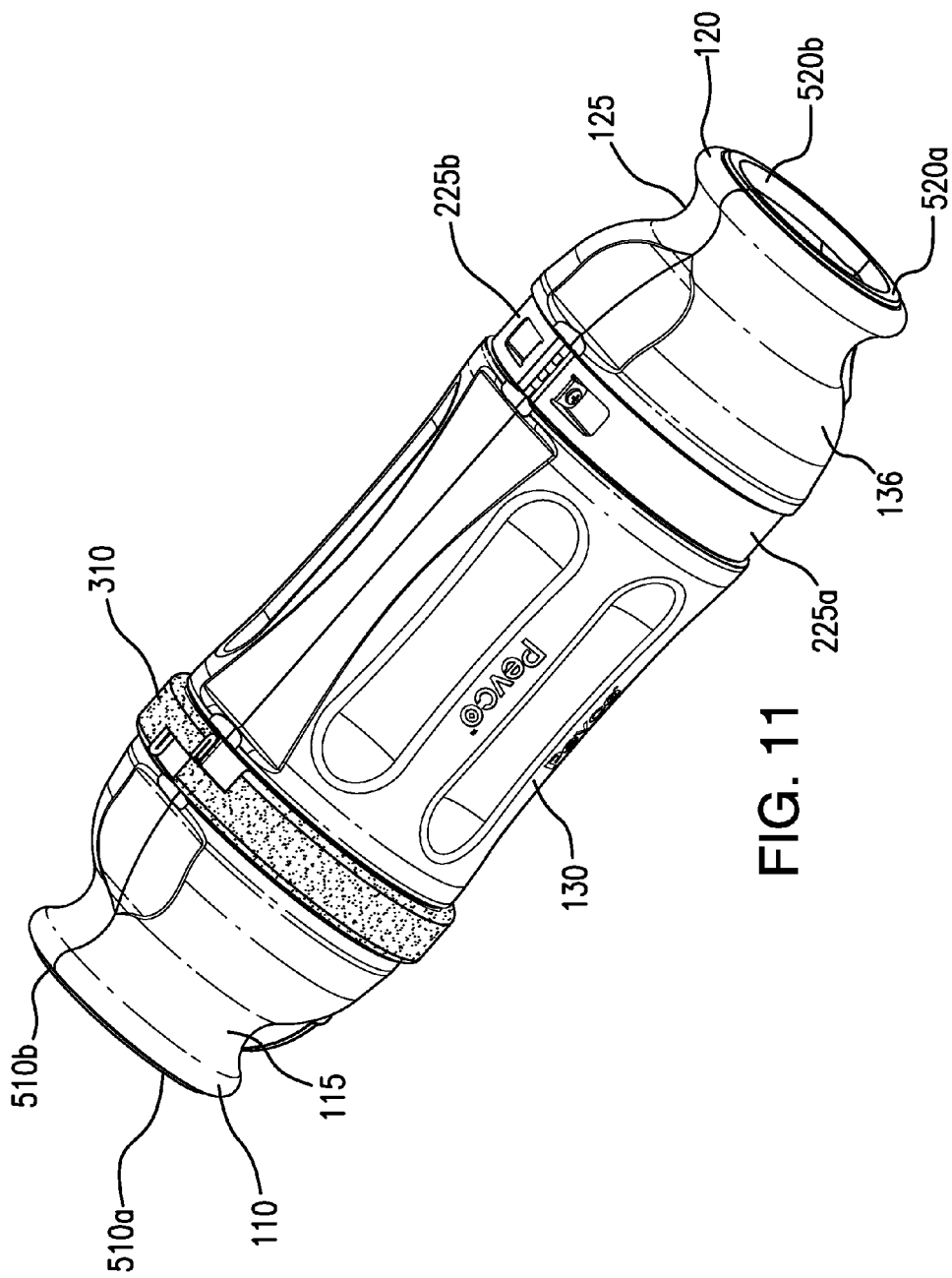
FIG. 11 is a rear perspective view of the carrier apparatus shown in FIG. 1, with certain features removed for illustrative purposes.

In the illustrated embodiment, carrier apparatus 10 additionally includes a plurality of replaceable end caps 510a, 510b (visible in FIGS. 11-12, 15), 520a, 520b detachably coupled as shown to a corresponding end portion 110, 120 of the housing 100. The end caps 510a-520b are actually formed in (semi-) sections corresponding to the end portion contour of the housing sections 100a, 100b to which they are respectively coupled. They serve to collectively protect the housing's end portions 110, 120 against impact. Toward that end, each end cap 510a-520b is preferably formed of a material whose resilience is greater than the housing's material, such as a low density plastic or a dense foam material. Like the housing 100, each end cap 510-a-520b is preferably formed of a material that resists clinging of dirt or other debris.

During use in a pneumatic tube delivery system, a carrier apparatus 10 is propelled by air pressure and vacuum to its destination. As it approaches a destination outlet's workstation, the apparatus will typically encounter a metallic slide plate, contacting it with some measure of force. The carrier apparatus 10 is stopped by this slide plate, and thereafter dropped onto a receiving pad surface at the destination's workstation once the slide plate is slid out of the way. Although the air pressure is removed at this point, the carrier apparatus 10 in most systems still hits the slide plate with considerable noise and impact. The protective padding provided by the end caps 510a-520b both softens the impact and deadens the noise, making for a safer, quieter arrival at the destination outlet's workstation.

The end caps 510a-520b are coupled to the housing sections' axial ends preferably by either snap fit or slide-fit engagement. They are preferably coupled in this manner to be conveniently replaceable as needed. As such, each of the end caps 510a-520b may be provided with a certain color, texture, or other indicia to mark the given carrier apparatus 10 according to a particular marking or classification scheme if one is in use in the intended application. For example, a barcode or other unique identifying indicia 512, 522 may be applied to one or more of the end caps 510a-520b as a way to identify each carrier, thereby enabling positive identification when leaving and arriving at a workstation. This may be in place of or in addition to the identifying indicia 140a, 140b illustratively shown applied to the housing sections 100a, 100b in the disclosed embodiment.

In certain other alternate embodiments, the identifying indicia 512, 522 may be applied to the surfaces of the end portions 110, 120 otherwise underlying and covered by the end caps 510a-520b. The end caps themselves would define accommodating cutouts or windows through which the identifying indicia 512, 522 may be visible as a carrier 10 leaves or arrives at a workstation. Subsequent replacement of the end caps 510a-520b could occur, then, without disturbing the carrier's identifying indicia 512, 522, which would remain in place on the carrier's end portions 110, 120.

FIGS. 9-12 show carrier apparatus 10 still closed and latched, but with certain parts exploded or removed for clarity of illustration. As shown, the glide band portions 310, 320 of the retaining assemblies 210, 220 are each preferably formed by respective glide band segments 310', 310", 320', 320" separately attached to housing sections 100a, 100b. This helps to keep the glide bands attached and closely conformed to the housing 100 even when the housing sections 100a, 100b are displaced relative to one another in opening and closing the housing. Each glide band segment 310', 310", 320', 320" (shown partially cut away in the various views) is attached to the underlying band collar segments 215a, 215b, 225a, 225b (described in following paragraphs) by adhesion segments 3100', 3100", 3200', 3200". Adhesion segments 3100', 3100", 3200', 3200" may be formed of any suitable material and construction known in the art to keep the glide band segments firmly attached. For example, they may simply include a layer of adhesive; alternatively, they may include structured strips such as adhesively backed hook and loop type fastening strips to which the glide band segments are releasably fastened.

Glide band segments 310', 310", 320', 320" too may be formed of any suitable material and construction known in the art, so long as it provides the requisite combination of surface glide capability and wear resistance for the intended application. In the illustrated embodiment, each glide band segment 310', 310", 320', 320" is preferably formed of a durable textile material having a fibrous structure. An example may be a dense fibrous material of the type used on the loop side of hook and loop type fasteners. Another example is a brush-like, densely packed surface of polymeric bristle elements that provide a durable yet smooth glide interface within the delivery tube conduits.

As the cut away portions in the various views reveal, each glide band segment 310', 310", 320', 320" is shown preferably, though not necessarily, as a strip of material whose side edges define flexible wing extensions 312, 314, 322, 324 which are respectively folded over the band collar segments 215a, 215b, 225a, 225b and intervening adhesion segments 3100', 3100", 3200', 3200" and neatly joined along a lengthwise seam underneath. This adds to the segments' thickness (to help clear the housing's outer surface radially) and leaves no edges of the strip material exposed in the direction of travel. The wrap-around configuration also secures the glide band segments' attachment to their band collar segments.

This exemplary embodiment using the glide band and adhesion segments as reflected in the FIGS. represent but one of numerous embodiments which may be employed in carrier apparatus 10. In alternate embodiments, not only may each glide band segment be formed with different materials, they may be configured so as to obviate the need for the separate adhesion segments shown. For example, each glide band segment may include a glide layer formed on a backing strip. The glide layer may extend laterally (or transversely) beyond the backing strip to define its own lengthwise wing extensions which fold over the side edges of the supporting band collar segment 215a, 215b, 225a, or 225b underneath. The wing extensions may be provided with adhesive strips therebeneath to secure in place against the band collar segment edge upon wrapping around and extending underneath it. The securement would be reinforced once the band collar segment (with the glide layer wing extensions wrapped around its edges) is installed in place against the carrier's housing.

Figure 12:
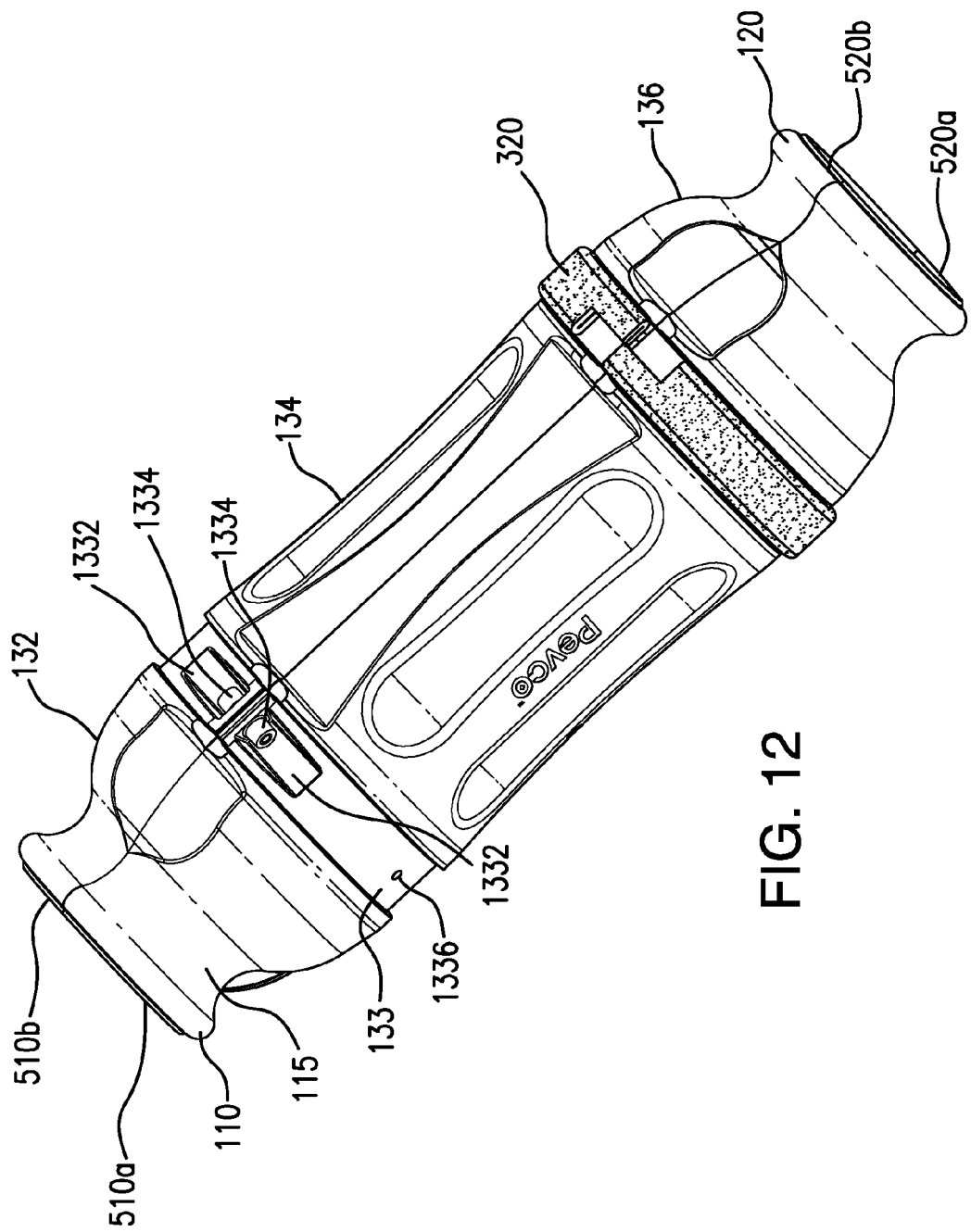
FIG. 12 is another rear perspective view of the carrier apparatus shown in FIG. 1, with certain other features removed for illustrative purposes.

In the event that the wing extensions wrapped around and tucked underneath a band collar segment together do not fully span the bottom surface of that band collar segment (to join at a seam under the band collar segment), suitable measures are preferably taken to accommodate the resulting structure. For example, an accommodating recess 133 formed about each of the housing sections 100a, 100b (as shown in FIG. 12 and discussed in following paragraphs) may be alternately configured, with grooves or tracks (not shown) further formed in the recessed surface illustrated in FIG. 12. These grooves/tracks would run annularly along the recessed surface at its outermost sides (to define gutter-like stepped surface profiles there). The depressions formed by such grooves/tracks in the recessed surface would provide the necessary clearance for the glide layer's wing extensions tucked underneath a collar segment 215a-225b to keep the exposed upper annular surface of the glide layer substantially level and undistorted.

Figure 13:
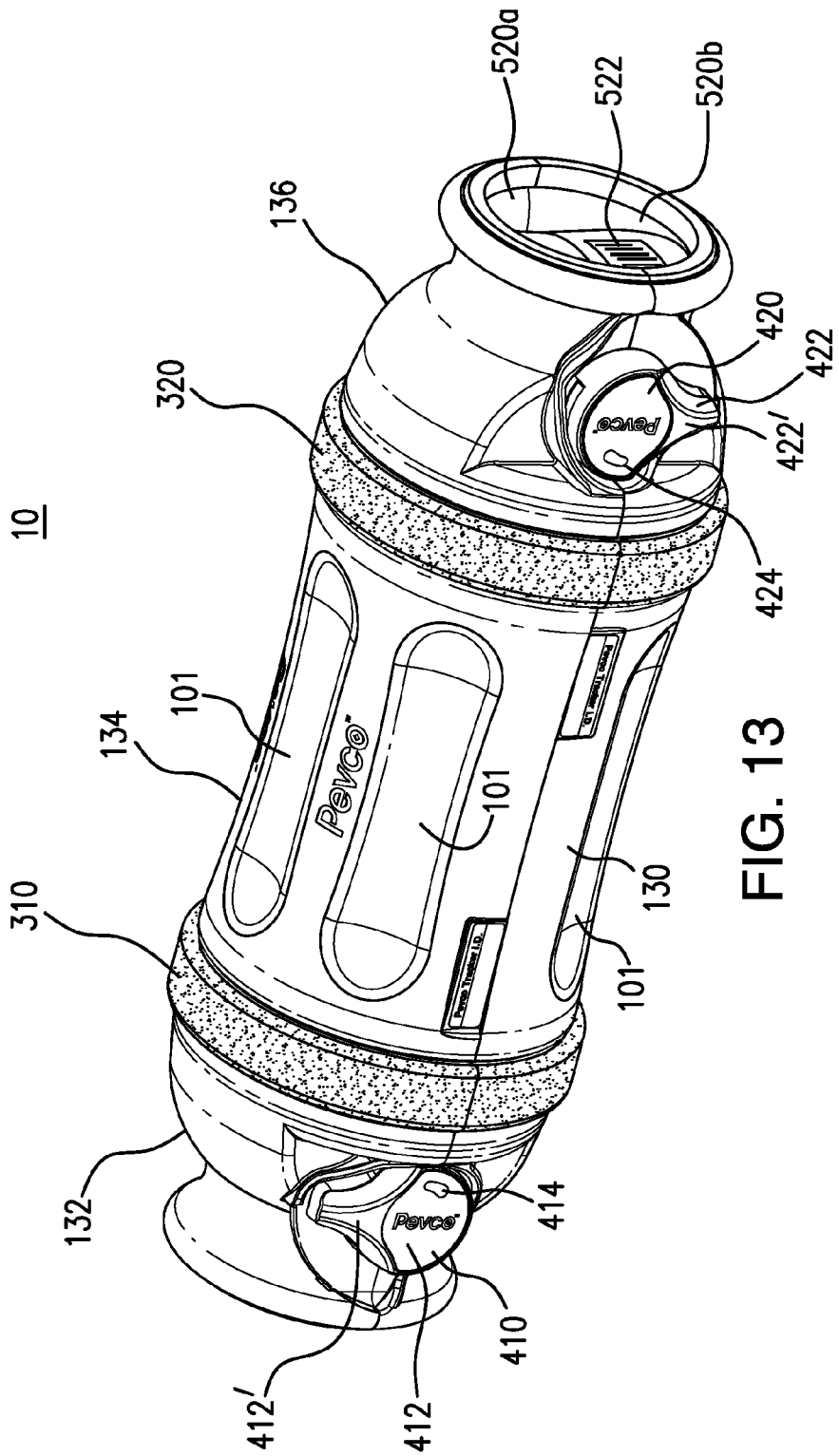
FIG. 13 is a perspective view of the carrier apparatus shown in FIG. 1, illustrated in a closed but unlatched configuration.

Turning to FIGS. 13-18, carrier apparatus 10 is shown unlatched though closed in FIG. 13, then opened at various stages of assembly in FIGS. 14-18 (with certain parts shown exploded or removed for clarity of illustration). In FIG. 13, where the carrier apparatus 10 is still in its closed configuration, both rotary assemblies 410, 420 are turned to their unlatched angular positions to permit opening of the apparatus. Housing sections 100a, 100b may then be separated and drawn away from each other to open access to the carrying compartment 150 formed collectively by the cavities 150a, 150b defined within each housing section 100a, 100b. In the embodiment shown, retaining assemblies 210, 220 provide hinged joints about which the axial housing sections 100a, 100b are coupled in pivotally displaceable manner. The two sections 100a, 100b may thus be swung freely between the closed and opened configurations in order to load and unload the given payload.

Preferably, housing 100 is sectioned as shown into a pair of substantially identical half sections 100a, 100b coupled together complementary manner. In certain alternate embodiments, housing 100 may be formed otherwise, for example by more than two separable sections. They may be formed in other examples to span less than the entire axial length of the housing, and with disparate structural configurations. Sectioning the housing 100 in the manner illustrated (into substantially identical, complementarily joined half sections 100a, 100b spanning the axial length), however, offers certain notable advantages. First, it simplifies manufacture by enabling the core of both sections 100a, 100b to be formed using a shared mold assembly. Also, forming each section 100a, 100b to span the entire axial length of housing 100 tends to maximize structural integrity, as the direction of travel and direction of greatest impact/forces encountered during use tend to both be along the housing's axis.

The interchangeable housing section cores yield a structural modularity which is enhanced by detachable retaining assemblies 210, 220 that cuff the housing sections 100a, 100b together in pivotally displaceable manner. Each retaining assembly 210, 220 preferably includes a band collar 215, 225 formed with at least first and second collar segments 215a, 215b, 225a, 225b connected by a hinged joint 217, 227. Each semi-annular collar segment 215a-225b is received in the embodiment shown within an accommodating recess 133 formed about each of the housing sections 100a, 100b. This keeps each collar segment 215a-225b from axial slippage off of the housing section.

Each of the collar segments 215a-225b terminates at a hooked end 2152a, 2152b, 2252a, 2252b which engages an outer side edge of its housing section 110a, 110b. One or more indents 1336 are provided on the surface within recesses 133 for receiving opposing protuberances underneath the band collars 215, 225 (or even fasteners passed through the band collars) should supplemental retention support be necessary at the band collars' intermediate points.

Each of the collar segments 215a-225b is preferably formed with an anchoring tab 2154a, 2154b, 2254a, 2254b that bends inward into an accommodating recess 1332 to be fastened against a corresponding boss 1334 of the given housing section 100a, 100b. Each collar segment 215a-225b is thereby secured in closely conformed manner about a housing section 100a, 100b. This is but one example of many suitable ways known in the art to secure the collar segments. It is preferable in this regard to secure the collar segments without actually penetrating the housing sections' walls, so that any leak resistant seal for compartment 150 may be preserved.

Preferably, the hinged band collar 215, 225 of each retaining assembly 210, 220 is formed of stainless steel or other such metallic material to provide a suitable combination of springy protective resilience, malleability, and strength. Use of such wrap-around band collars 215, 225 reinforces the overall strength of carrier apparatus 10, affording the use of a thinner walled housing 100, which in turn yields lesser weight. The band collars 215, 225 not only serve as retaining frame members for the housing sections 100a, 100b, they provide effective substrate surfaces for attaching the glide band portions 310, 320. Worn or damaged glide band portions 310, 320 may then be replaced by either detaching from the band collar if it can be done neatly, or by altogether removing the band collar itself from the housing sections 100a, 100b for substitution with an entirely new retaining assembly equipped with a replacement glide band.

As noted, band collars 215, 225 provide hinged joints 217, 227 for pivotal displacement between the housing sections. These hinged joints 217, 227 may be realized using rigid or non-rigid joints to the extent permitted by the requirements of the intended application. Provision of such via the band collars 215, 225, however, avoids problems which commonly plague the many known carriers utilizing a so-called piano hinge structure integrated into a carrier main body to run substantially along its length. The wrap-around band collar structure 215, 225 keeps the hinged joints from disrupting the seal effected by the carrier housing that is enwrapped. The structure also localizes the hinged joints to discrete points along the housing, and thereby minimizes the potential snag hazard that they present.

In accordance with certain aspects of the present invention, carrier apparatus 10 is equipped with rotary-type latch assemblies 410, 420. An advantage of these rotary latch assemblies is the absence of any potentially protrusive latching arms. Whether fully latched or unlatched, the rotary latch assemblies remain within the carrier's outer profile, eliminating any potential for snagging on equipment encountered during transport, such as gatling-type transfer units. This is unlike many known assemblies where an improperly secured latching arm could readily flip up during transport, snag a surrounding part, and either snap off or restrain the carrier against further travel. Even if the carrier is able to make it through to its destination outlet, the residual debris left as a result of leaked payload and/or broken off carrier parts presents a jamming hazard for other oncoming carriers. As mentioned, a jammed carrier is quite troublesome because precious resources are lost in trying to dislodge a jammed carrier—by air pressure or even by actual cutting into the conduit tubing.

The latch assemblies each include a rotary latch member 412, 422 pivotally coupled to one of the housing sections 100a, 100b. Each rotary latch member 412, 422 is situated such that, with the housing sections 100a, 100b closed against each other, it may begin to turn from the unlatched angular position shown in FIGS. 13-14 towards its fully latched position shown in FIG. 1, only if the housing sections 100a, 100b are properly aligned as well. When the housing 100 is thus in its proper closed configuration, the rotary latch member 412, 422 is cleared to rotate and enter into lateral engagement with one or more latching protuberances 133a, 133b formed on an opposing portion of the other housing section 100a, 100b. This immediately locks the housing sections 100a, 100b together in their fully closed positions (bearing against each other); and, the continued advancement of the rotary latch member 412, 422 enlarges the area of engagement with the corresponding protuberances 133a, 133b. This progressively strengthens the lock. As each rotary latch member 412, 422 advances angularly towards its fully latched position, therefore, the housing sections 100a, 100b continue to remain in their closed positions against one another, but the degree of engagement between the rotary latch member 412, 422 and its latching protuberances 133a, 133b increases, making the latch progressively more secure (more difficult to inadvertently defeat). Thus, even with partial engagement between these latching components, the housing sections 100a, 100b are and remain fully joined (maintaining full closure of the housing 100).

The rotary latch members 412, 422 are configured to slide into interlocking engagement with the latching protuberances 133a, 133b. Consequently, they cannot advance into the range of progressive latching positions until and unless the latching protuberances 133a, 133b are properly positioned relative to the rotary latch members 412, 422. In other words, with the housing 100 substantially closed, its housing sections 100a, 100b cannot be latched together even partially, unless they are aligned enough that the respective engaging parts of the rotary latch members 412, 422 may be guided between the opposed latching protuberances 133a, 133b. Insufficient alignment between the housing sections 100a, 100b will cause obstruction between the rotary latch members' engaging parts and the opposing protuberances 133a, 133b. The rotary latch members 412, 422 in that event would be blocked from rotation into a latching position—unless of course the housing sections 100a, 100b were drawn far enough apart to put the opposing protuberances 133a, 133b out of the rotary latch members' reach, thereby leaving the housing 100 in an obviously open configuration. This helps to guard against false-positive identification of carrier latching state.

In accordance with certain aspects of the present invention, therefore, unless a rotary latch member is fully at its unlatched angular position, the hinged sections of the carrier apparatus housing will be obstructed by the latch member itself from being fully joined at their free edges. The obvious gap between the two sections' free edges should alert the user of the unjoined and unlatched condition before he/she proceeds to initiate transport. Conversely, if the rotary latch members are in their unlatched angular positions, rotation of each latch towards its closing position will be impeded unless the carrier housing sections are joined in suitable alignment along their opposing free edges for latching. Once the rotation of a latch is underway towards its closing position, it immediately engages the other housing section to effect at least partial latching. The rationale: some latching is better than no latching.

Figure 14:
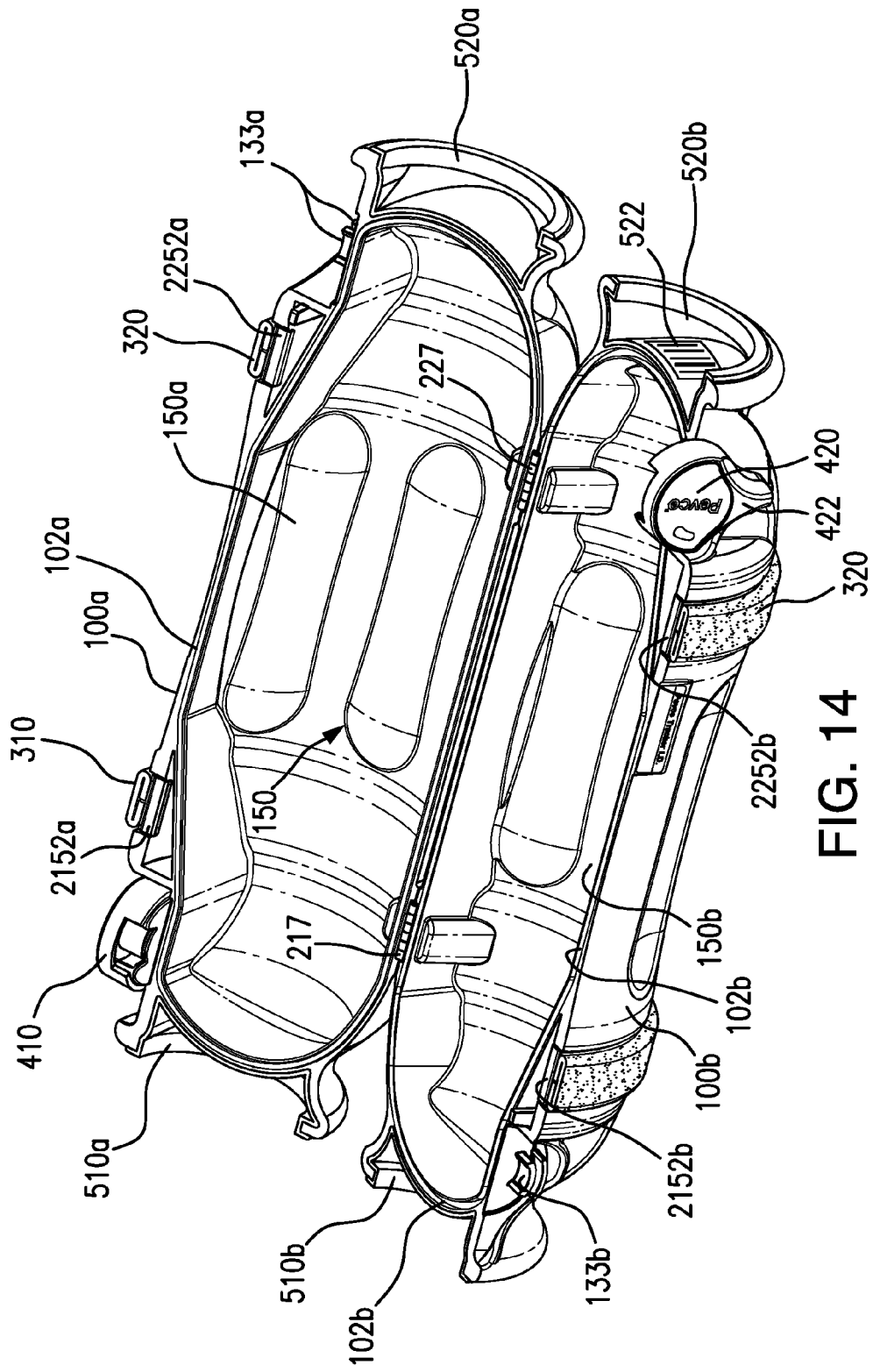
FIG. 14 is a perspective view of the carrier apparatus shown in FIG. 1, illustrated in an open configuration.

Further safeguards preferably incorporated into each rotary latch member 412, 422 to provide false closure detection include the general contouring of each latch member much as a radial dial elongated to culminate in a radial pointer projection 412', 422'. In the fully latched position of FIG. 1, the pointer projection 412', 422' of each member substantially aligns with the axis of housing 100, while in the unlatched position, it is cross-oriented relative to the housing's axis, as illustrated in FIGS. 13-14. This provides a conspicuous visual cue as to the latching state. Intermediate angular positions of the rotary latch members 412, 422 between these two limits are likewise conspicuously indicated by the members' dial-like pointer contour.

An additional safeguard is preferably incorporated in the form of a window 414, 424 formed in each rotary latch member 412, 422. When coupled with a stationary visual marker (such as a strip of color, graphic pattern, or the like) provided underneath, the window may be filled proportionately with the visual marker as it moves (relative to the marker) with the rotary latch member's rotation. Depending on the latch member's angular position relative to the housing 100, for example, the window 414, 424 may be filled with a color such as green when in the fully latched position (indicating a 'go' for carrier transport). Conversely, when the rotary latch member is turned to its unlatched position, the window may be filled with a color such as red (to indicate a 'stop' against carrier transport). A combination of the opposing colors, or altogether different intermediate colors, may occupy the window depending on the rotary latch member's intermediate angular position between the fully latched and unlatched positions.

Figure 15:
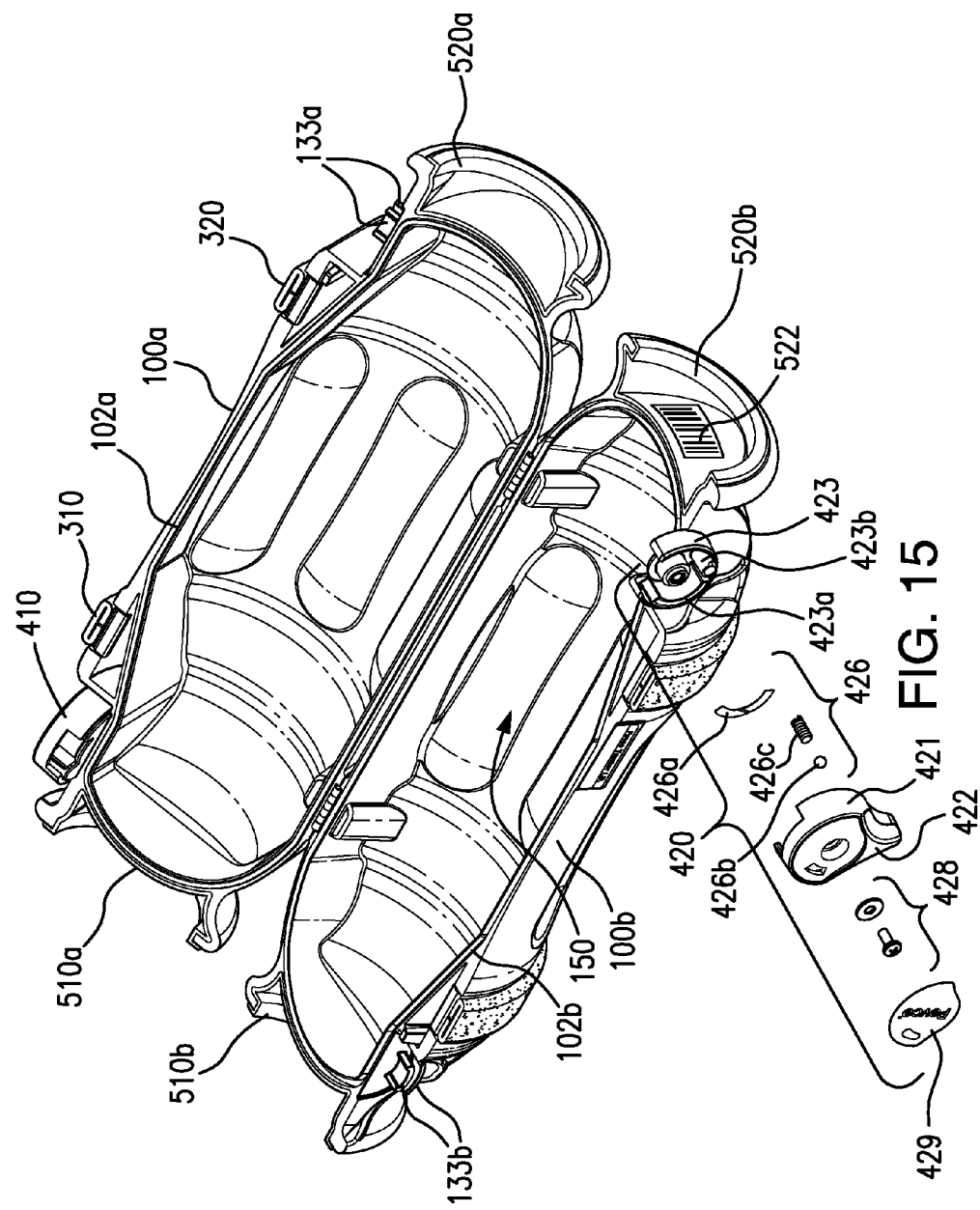
FIG. 15 is a partially exploded perspective view of the carrier apparatus as shown in FIG. 13, illustrated in an open configuration.
Figure 16:
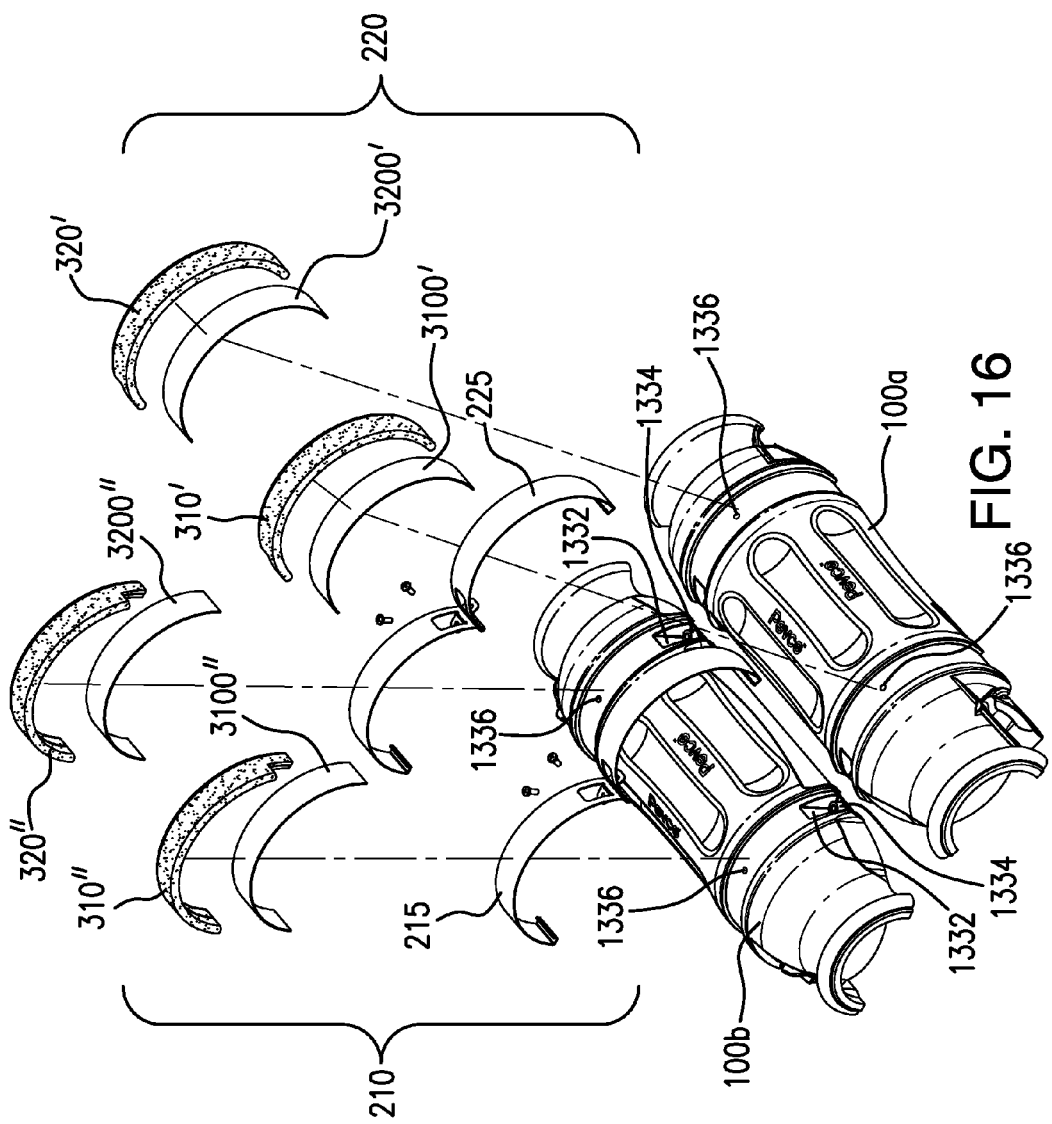
FIG. 16 is a partially exploded rear perspective view of the carrier apparatus shown in FIG. 1, illustrating components thereof in unassembled form.
Figure 17:
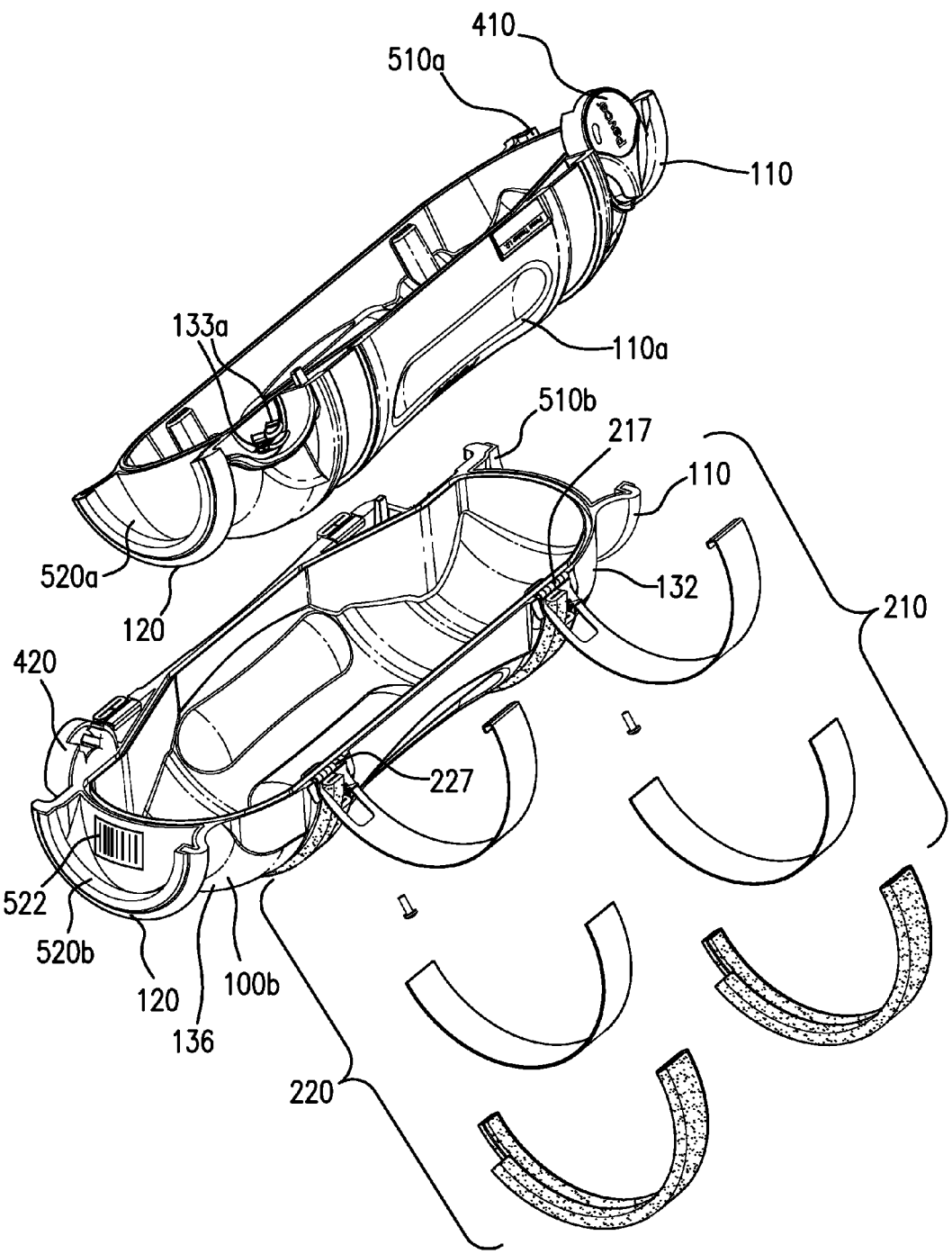
FIG. 17 is another partially exploded rear perspective view of the carrier apparatus shown in FIG. 1, illustrating components thereof in unassembled form.
Figure 18:
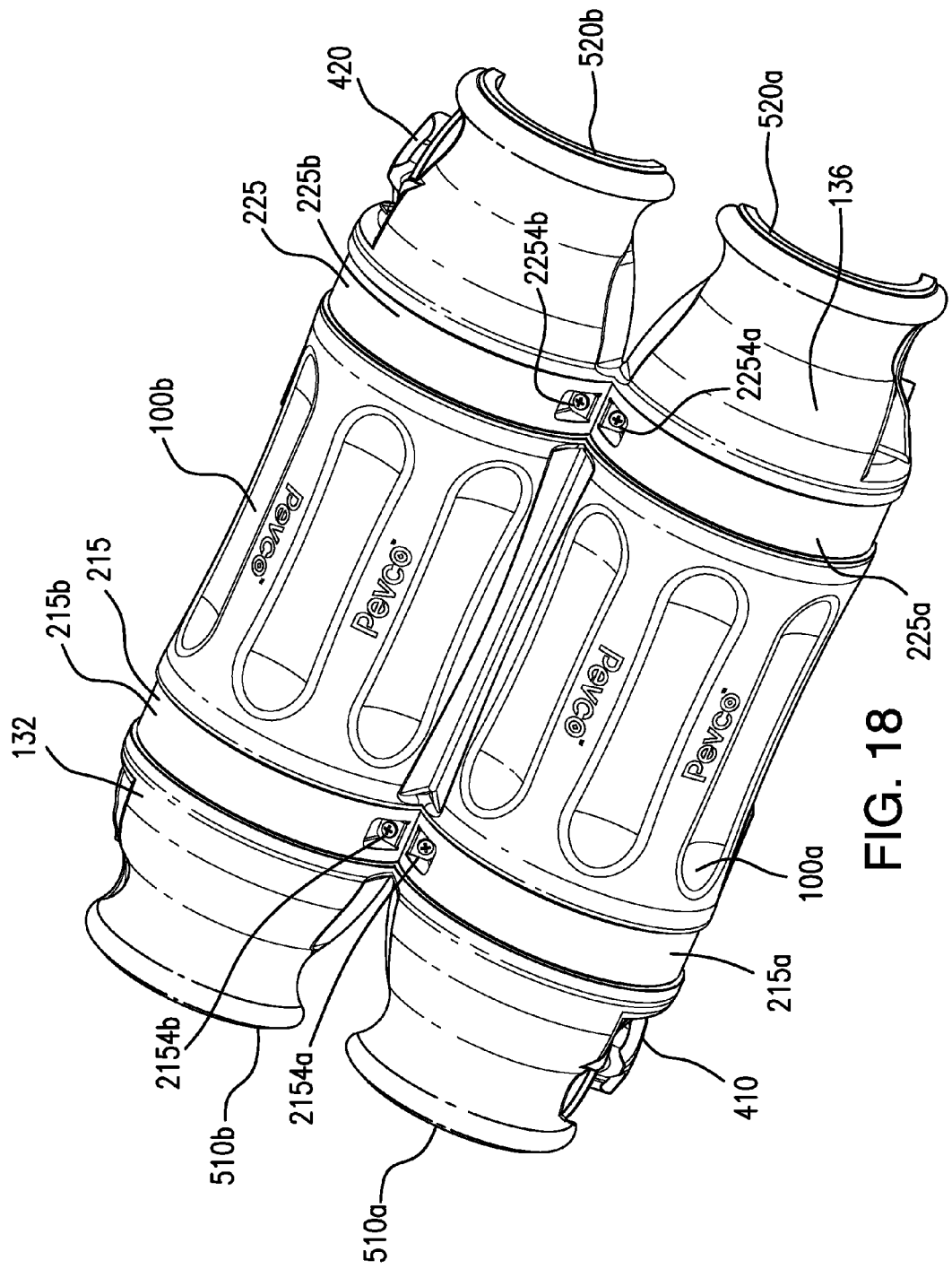
FIG. 18 is a rear perspective view of the carrier apparatus shown in FIG. 1, illustrated in an open configuration with certain features removed for illustrative purposes.

In the illustrative embodiment shown, the visual feedback provided by the rotary latch members' directional shapes and indication windows is augmented by tactile and/or audible feedback. As shown in FIG. 15, each rotary latch assemblies 410, 420 is itself formed as a set of components assembled onto a support bracket 423 provided on the given housing section 100a, 100b. Only assembly 420 is representatively shown exploded in FIG. 15 for clarity, as the other assembly 410 is preferably of like structure. The component set includes a main body 421 through which the window 414, 424 is formed, and a matching cover plate 429. The main body 421 is rotatably fastened to the support bracket 423 by suitable fastener elements 428. Captured between the main body 421 and support bracket 423 is a set of feedback elements 426 which include a visual marker strip 426a as well as a ball bearing 426b biased by a load spring 426c. The visual marker strip 426a (received on surface 423a of the support bracket 423) is provided with a range of indicative colors, designs, or the like to cooperate in predetermined manner with the corresponding indication window 414, 424 as described in preceding paragraphs. The ball bearing 426b and load spring 426c are received within a bore 423b of the support bracket 423 to engage a contoured bottom of the main body member 421 in spring biased manner. When the main body member 421 reaches a predetermined angular position, the spring loaded ball bearing 426b clicks into place against a recess or other suitable feature in the main body member's contoured bottom. The user will hear and feel the clicking as the ball bearing snaps into place.

Preferably, each rotary latch member 412, 422 is configured to be inertially aligned with the carrier apparatus 10 when in its fully latched position. In the embodiment shown, the longitudinally extended latch members 412, 422, when fully latched, are angularly positioned to align with the carrier's travel direction (axial direction in the illustrated embodiment). The rotary latches are thus inertially aligned with the carrier apparatus 10, so as to withstand the considerable axial impact encountered during transport without loosening rotation as a result. In contrast, were the fully latched position defined by a cross-orientation of the rotary latch members 412, 422, axial impact on the carrier apparatus might overcome each latch member's moment of inertia and cause unwanted rotation away from that fully latched position during transport. In this regard, configuring the fully latched position to align with the carrier's travel direction yields symmetry across the travel axis-such that the angular momentum experienced by opposing portions of the rotary latch member across the travel axis mutually cancel.

If a rotary latch member 412, 422 were disposed at an intermediate (less than fully latched) angular position during transport, then, the net effect of such angular momentum due to axial disturbance would tend to displace the member back towards its fully latched, in-line position. Thus, the normal axial disturbances encountered by a carrier apparatus during use would tend toward reinforcing rather than undoing the latching strength of each rotary latch member 412, 422.

While carrier apparatus 10 may be formed in accordance with the present invention either with or without a leak resistance feature, the leak resistance feature may be quite essential in certain applications, where liquid or semi-liquid payloads are expected. In the illustrated embodiment, a leak resistant seal is preferably incorporated between the housing sections 100a, 100b. The peripheral adjoining edges 102a, 102b of the housing sections 100a, 100b are preferably configured toward that end for tongue and groove, or other such mated coupling. In the example shown, one of the adjoining edges (for example, edge 102a in this case) is formed with a peripheral tongue, while the other (for example, edge 102b in this case) is formed with a peripheral groove. A gasket (not shown) is preferably inserted within the peripheral groove of edge 102b and captured therein by the peripheral tongue of the opposing edge 102a, when the housing sections 100a, 100b are brought together upon closure of carrier apparatus 10. Full closure compresses the gasket between the adjoining edges 102a, 102b to establish a leak resistant seal about the payload compartment 150.

In accordance with certain other aspects of the present invention, carrier apparatus 10 is formed with an overall outer contour that optimizes both its maneuverability through the intricate confines of a pneumatic tube delivery system and its stability as a manually handled canister. In this regard, housing 100 is formed with a body portion 130 whose intermediate region is reduced in diametric extent. Body portion 130 is formed, for example, with a tapered mid-section defining a generally concave outer surface profile intermediately between those portions of the housing encircled by the glide band portions 210, 220. Somewhat like a hyperboloid structure, this intermediately tapered profile provides a gradual reduction in diameter between the glide portions 310, 320 towards the central region of the housing.

Depending on the extent and complexity of the given system, its network of pneumatic tube conduits will include numerous bends and turns, some of which may be of relatively small turn radius. The reduced intermediate diameter provides sufficient clearance for the carrier apparatus 10 to negotiate those turns in the conduits without getting stuck. This is aided by a generally conical tapering of the shoulder-like regions 132, 136 just outside the glide portions 310, 320. The conically-tapered surfaces at those regions 132, 136 provide the forward/aft clearances (against the conduit surfaces defining the outer wall at a bend) cooperate with the intermediate clearance provided by the intermediate region 134 (against the conduit surfaces defining the inner wall at a bend) to help carrier apparatus 10 slide freely through the bend. The rotary latch members 410, 420 are disposed in accommodating recesses formed in the shoulder regions to the extent necessary to avoid disruption of their forward/aft clearance profiles.

The tapered intermediate profile also aids a user's secure handling of the carrier housing. Not only does the profile make for a more ergonomic structure, a plurality of elongate wells 101 preferably formed on the outer surfaces of the housing sections 100a, 100b also provide gripping grooves for a user. Instead of having to essentially 'palm' a smooth, rounded surface to hold the carrier intermediately by its body, the user may actually grip the wells 101 with his/her finger tips for tighter hold of the body.

Figure 20:
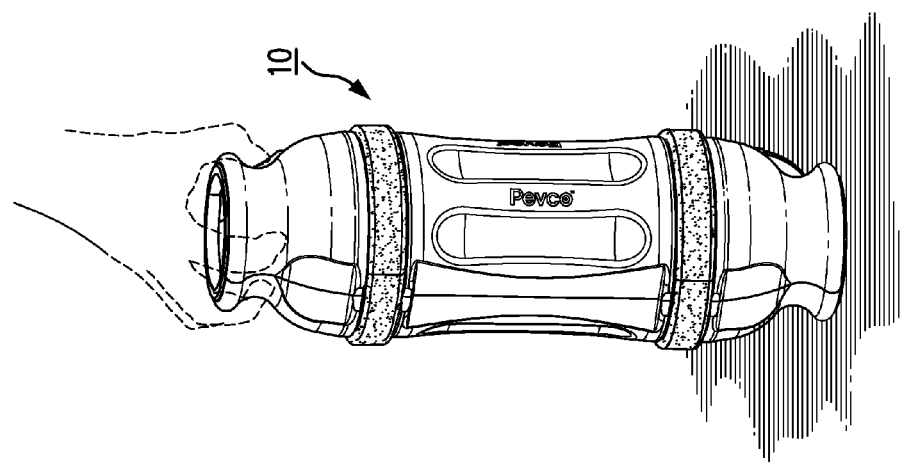
Figure 19:
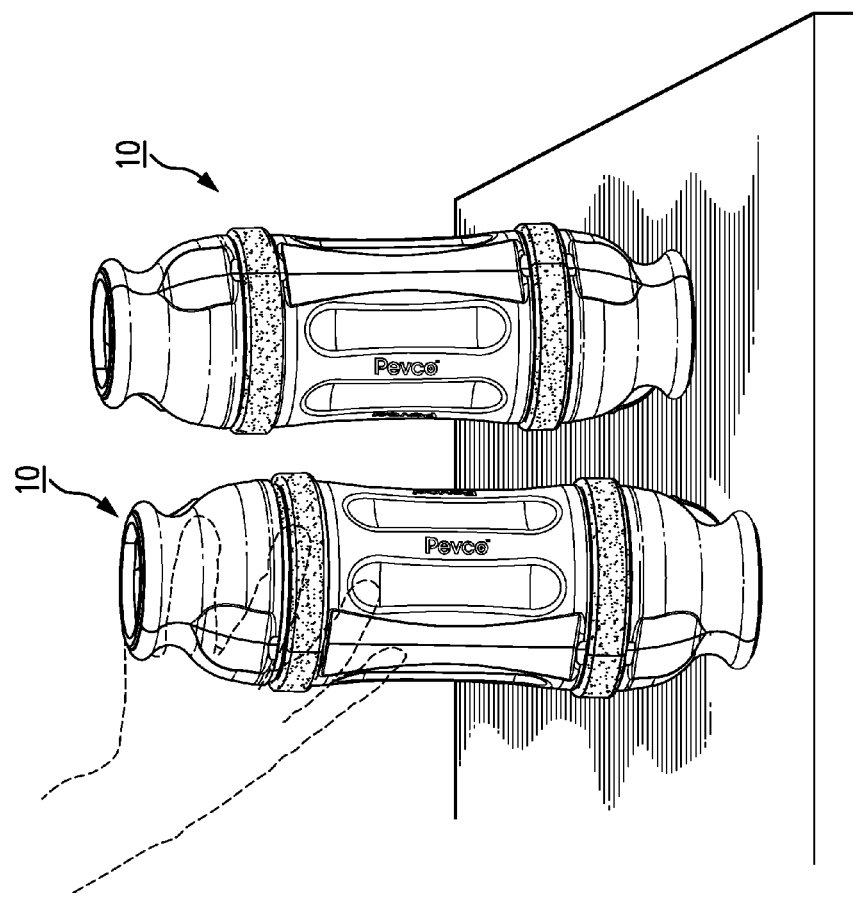
FIG. 19 is a perspective view illustrating certain features of a plurality of carrier apparatuses shown in FIG. 1; and, FIG. 20 is another perspective view illustrating certain features of a carrier apparatuses shown in FIG. 1.

The housing 100 is also contoured so that a user may conveniently and safely handle carrier apparatus 10 much as one would handle a portable canister. Each end portion 110, 120 of the housing unit is accordingly connected to the shoulder regions 132, 136 of the body portion by a radially constricted neck portion 115, 125. The resulting wineglass bottom type structure defines a convenient grasping handle, such as illustrated in FIGS. 19-20, whereby a user may securely grasp the carrier apparatus 10 by one end. For example, a user may firmly grasp the carrier apparatus 10 by wrapping his/her hands around a shoulder region 132, 136 at one end portion 110, 120 and cradling the neck portion 115, 125 by tucking the inner sides of the thumb and index finger snuggly underneath the lip formed by that end portion 110, 120 (as illustrated in FIG. 19). Alternatively, a user may cup one of the end portions 110, 120 with his/her hand, then grip by bending the fingers and thumb over the lip formed by that end portion 110, 120 and down into the neck portion 115, 125 (as illustrated in FIG. 20).

An added benefit of the wineglass bottom type ends provided on carrier apparatus 10 is the secure storage they facilitate. A multitude of carriers may be stored on a wineglass rack type storage fixture, secure by cradled support of one or both of the neck portions 115, 125.

Users of pneumatic tube delivery systems typically handle a high volume of transport traffic at their respective portals/work stations. Like the need for conspicuous visual indicia when a carrier apparatus 10 is not properly closed and latched for safe transport, sure handling of the carrier apparatus before and after each transport is important to preserve safe, smooth workflow. This is especially so in critical settings such as hospitals where the transport traffic is not only heavy, but many of the payloads routinely transported by that traffic are delicate and highly sensitive. Compounding the situation is that the primary responsibilities of a user typically have nothing to do with the actual transport of the payloads. The very point of installing a pneumatic tube delivery system is to obviate the need for any couriers or other dedicated delivery personnel, and thereby allow professionals like lab technicians, physicians, nurses, and administrators to directly deliver materials to and from one another. Focused attention on their primary tasks tends to detract from the attention these users are able to devote to incidental tasks like the handling of carriers in sending and receiving materials through the delivery system.

The grasping handle features incorporated into carrier apparatus 10 certainly help in this regard. So do the configurations of the end portions 110, 120 themselves as support bases. Preferably, at least one end portion 110, 120 is contoured to form a stable freestanding base for the carrier apparatus 10. Each of the end portions 110, 120 is formed in the embodiment shown with an annular base accordingly proportioned relative to the rest of the carrier apparatus 10 to provide firm, well balanced support on a flat surface. Hence, a user may, without undue worry of tipping, set the carrier apparatus 10 conveniently down vertically on end-rather than setting the apparatus down horizontally on a side and risk its rocking or rolling away (to possibly knock against a sensitive item nearby, drop off the end of an elevated work surface). The end caps 510a-520b installed at the respective end portions 110, 120 collectively serve as 'shoes' in this regard, providing a measure of protective resilience and stabilizing traction upon the surface underneath.

Although not shown, carrier apparatus 10 as deployed will normally include some internal protective measures within its payload compartment 150. This may be in any form known in the art suitable for the intended application. One example is a shaped foam insert that surrounds the payload to provide a cushioned barrier thereabout. Other examples include pneumatic self-conforming membranes. Still other examples include deflectable structure formed of elastic or other resilient material whose elements deflect as needed to accommodate the peculiar shape and load of the given payload item.

Such protective measures may be used in combination with partitioning measures for segregating multiple payload items, both to keep the items from knocking against one another and to keep them from cross-contamination should any breakage or release occur during transport and handling.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular applications of elements may be reversed or interposed, all without departing from the spirit or scope of the invention as defined in the appended claims.

What is claimed is:

1. A carrier apparatus for transport through a pneumatic tube delivery system comprising:
 a housing contoured with forward and aft portions and an axially extended body portion disposed therebetween, said housing including at least first and second separable sections enclosing a carrying compartment;
 at least a pair of retaining assemblies detachably coupled to said housing, each said retaining assembly encircling said body portion of said housing to couple said first and second housing sections for angular displacement one relative to the other between open and closed configurations, each of said retaining assemblies including a glide band portion disposed to protrude radially from said housing in said closed configuration for slidably engaging an inner wall surface of a pneumatic delivery tube; and,
 at least one latch assembly coupled to releasably lock said housing sections in said closed configuration wherein each said retaining assembly includes at least first and second collar segments respectively coupled to said first and section housing sections, said first and second collar segments being connected by a hinged joint.

2. The apparatus as recited in claim 1, wherein said housing defines symmetric forward and aft portions, each of said forward and aft portions being contoured to form a freestanding base.

3. The apparatus as recited in claim 2, wherein each of said forward and aft portions of said housing is connected to said body portion by a radially constricted neck portion to define a grasping handle.

4. The apparatus as recited in claim 1, wherein said first and second housing sections are joined in sealed manner about said carrying compartment when in said closed configuration.

5. The apparatus as recited in claim 1, wherein at least one of said first and second housing sections is formed of a translucent material to maintain at least partial visibility into said carrying compartment therethrough.

6. The apparatus as recited in claim 1, further comprising a plurality of selectable end caps each detachably coupled to one of said front and aft portions of said housing, said end caps being configured to protect said front and aft portions against impact and to variously impart selectable indicia thereto.

7. The apparatus as recited in claim 6, wherein each of said end caps is formed of a material greater in resilience than said end portion of said housing.

8. The apparatus as recited in claim 6, further comprising identifying indicia applied to said housing, at least one of said end caps defining a window providing visibility of said identifying indicia therethrough.

9. The apparatus as recited in claim 1, wherein said body portion of said housing extends axially to define an intermediately tapered profile between said glide band portions.

10. The apparatus as recited in claim 1, wherein:
 said latch assembly includes a rotary latch member coupled to said first housing section in angularly displaceable manner for displacement between a fully unlatched position and a range of progressive latching positions extending angularly therefrom;
 said rotary latch member in each of said progressive latching positions retentively engages said second housing section for securement to said first housing section; and,
 said rotary latch member is stopped against retentive engagement of said second housing section upon misalignment between said first and second housing sections.

11. The apparatus as recited in claim 10, wherein said rotary latch assembly includes visual indicia variably corresponding to said fully unlatched and progressive latching positions of said rotary latch member.

12. The apparatus as recited in claim 10, wherein said rotary latch member is positioned in angular alignment with an axis of said housing upon ranging fully through said progressive latching positions to fully engage said second housing section.

13. The apparatus as recited in claim 1, wherein said glide band portion is formed of a fibrous material.

14. The apparatus as recited in claim 1, wherein said glide band portion includes a wing extension configured to wrap around and extend underneath at least one of said first and second collar segments for secure attachment thereto.

15. The apparatus as recited in claim 10, further comprising a second latch assembly, wherein:
 said second latch assembly includes a second rotary latch member coupled to said second housing section in angularly displaceable manner for displacement between a fully unlatched position and a range of progressive latching positions extending angularly therefrom;
 said second rotary latch member in each of said progressive latching positions retentively engages said first housing section for securement to said second housing section; and,
 said rotary latch member is stopped against retentive engagement of said first housing section upon misalignment between said first and second housing sections.

16. A carrier apparatus for bidirectional transport through a pneumatic tube delivery system comprising:
 a housing contoured with a pair of opposing end portions and an axially extended body portion disposed therebetween, said housing including at least first and second separable housing sections enclosing a carrying compartment;
 at least a pair of collar assemblies detachably coupled to said housing, each said collar assembly encircling said body portion of said housing to couple said first and second housing sections for pivotal displacement one relative to the other between open and closed configurations, each said collar assembly including at least first and second collar segments connected by a hinged joint and respectively coupled to said first and second housing sections;
 a plurality of glide bands each fastened to one said collar assembly to protrude radially from said housing for slidably engaging an inner wall surface of a pneumatic delivery tube; and,
 at least one rotary latch member pivotally coupled to one of said housing sections to releasably lock the other of said housing sections thereto in said closed configuration.

17. The apparatus as recited in claim 16, wherein:
 each of said end portions of said housing is connected to said body portion by a radially constricted neck portion to define a grasping handle;
 said body portion of said housing extends axially to define an intermediately tapered profile between said glide bands; and,
 at least one of said first and second housing sections is formed of a translucent material to maintain at least partial visibility into said carrying compartment therethrough.

18. The apparatus as recited in claim 17, further comprising a plurality of selectable end caps each detachably coupled to one of said front and aft portions of said housing, said end caps being formed of a material greater in resilience than said end portion of said housing to protect said front and aft portions against impact, said end caps being configured to variously impart selectable indicia thereto.

19. The apparatus as recited in claim 17, wherein:
said rotary latch member is coupled to one of said housing sections in angularly displaceable manner for displacement between a fully unlatched position and a range of progressive latching positions extending angularly therefrom;
said rotary latch member in each of said progressive latching positions retentively engages the other of said housing section for securement to the one said housing section; and,
said rotary latch member is stopped against retentive engagement of the other said housing section upon misalignment between said housing sections.

20. The apparatus as recited in claim 19, wherein said rotary latch assembly includes visual indicia variably corresponding to said fully unlatched and progressive latching positions of said rotary latch member; and, said rotary latch member is positioned in angular alignment with an axis of said housing upon ranging fully through said progressive latching positions to fully engage the other said housing section.

21. The apparatus as recited in claim 19, wherein said first and second housing sections are joined in sealed manner about said carrying compartment when in said closed configuration.

22. A carrier apparatus for bidirectional transport through a pneumatic tube delivery system comprising:
a housing contoured with a pair of opposing end portions and an axially extended body portion disposed therebetween, each of said end portions being connected to said body portion by a radially constricted neck portion for defining a grasping handle and contoured to form a freestanding base, said housing including first and second axially separable sections enclosing a carrying compartment;
at least a pair of collar assemblies detachably coupled to said housing, each said collar assembly encircling said body portion of said housing to couple said first and second housing sections for pivotal displacement one relative to the other between open and closed configurations, each said collar assembly including at least first and second collar segments connected by a hinged joint and respectively coupled to said first and second housing sections;
a plurality of glide bands each fastened to one said collar assembly to protrude radially from said housing for slidably engaging an inner wall surface of a pneumatic delivery tube;
at least one rotary latch member pivotally coupled to one of said housing sections for releasably sealing the other of said housing sections thereto in said closed configuration; and,
a plurality of protective end caps each detachably coupled to one of said end portions of said housing, said protective end caps being formed of a material greater in resilience than said housing end portions.

23. The apparatus as recited in claim 22, comprising a plurality of said rotary latch members respectively coupled to said first and second housing sections, wherein:
each said rotary latch member is angularly displaceable between a fully unlatched position and a range of progressive latching positions extending angularly therefrom;
each said rotary latch member in said progressive latching positions retentively engages the other of said housing sections; and,
each said rotary latch member is stopped against retentively engaging the other of said housing sections upon misalignment between said housing sections.

24. The apparatus as recited in claim 23, wherein each said rotary latch member includes visual indicia variably corresponding to said fully unlatched and progressive latching positions thereof; each said rotary latch member being positioned in angular alignment with an axis of said housing upon ranging fully through said progressive latching positions to fully engage the other of said housing sections.

25. The apparatus as recited in claim 24, wherein:
said body portion of said housing extends axially to define a generally concave outer surface profile intermediately between said glide bands; and,
at least one of said first and second housing sections is formed of a translucent material to maintain at least partial visibility into said carrying compartment therethrough.

* * * * *